United States Patent
Park et al.

(10) Patent No.: US 11,637,669 B2
(45) Date of Patent: Apr. 25, 2023

(54) SINGLE FREQUENCY NETWORK TRANSMISSION PROCEDURE BASED ON SOUNDING REFERENCE SIGNALS

(71) Applicant: QUALCOMM Incorporated, San Diego, CA (US)

(72) Inventors: Sungwoo Park, San Diego, CA (US); Wooseok Nam, San Diego, CA (US); Tao Luo, San Diego, CA (US); Kiran Venugopal, Raritan, NJ (US); Tianyang Bai, Somerville, NJ (US); Xiaoxia Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/096,176

(22) Filed: Nov. 12, 2020

(65) Prior Publication Data
US 2021/0160028 A1    May 27, 2021

Related U.S. Application Data

(60) Provisional application No. 62/940,161, filed on Nov. 25, 2019.

(51) Int. Cl.
*H04W 4/00* (2018.01)
*H04L 5/00* (2006.01)
(Continued)

(52) U.S. Cl.
CPC ......... *H04L 5/0048* (2013.01); *H04W 24/08* (2013.01); *H04W 24/10* (2013.01); *H04W 56/001* (2013.01); *H04W 72/23* (2023.01)

(58) Field of Classification Search
None
See application file for complete search history.

(56) References Cited

U.S. PATENT DOCUMENTS

| 8,694,043 B2 * | 4/2014 | Racz | H04L 1/24 455/449 |
| 11,523,379 B2 * | 12/2022 | Dinan | H04W 72/042 |

(Continued)

FOREIGN PATENT DOCUMENTS

WO    WO-2019031944 A1    2/2019

OTHER PUBLICATIONS

International Search Report and Written Opinion—PCT/US2020/060460—ISA/EPO—dated Mar. 18, 2021 (200749WO).

*Primary Examiner* — Bob A Phunkulh
(74) *Attorney, Agent, or Firm* — Holland & Hart LLP

(57) ABSTRACT

Methods, systems, and devices for wireless communications are described. A serving cell may configure one or more neighbor cells to perform measurements on sounding reference signals (SRSs) received from a user equipment (UE). The serving cell and a subset of the one or more neighbor cells may then transmit data to the UE in a single frequency network (SFN) transmission based on the SRS measurements. For instance, the serving cell may determine whether to add each of the one or more neighbor cells to an SFN cell group for an SFN transmission to a UE based on measurements performed by each neighbor cell on SRSs received from the UE. A neighbor cell of the one or more neighbor cells may also determine which beam to use for an SFN transmission to a UE based on measurements performed by the neighbor cell on SRSs received from the UE.

29 Claims, 12 Drawing Sheets

(51) Int. Cl.
*H04W 24/08* (2009.01)
*H04W 56/00* (2009.01)
*H04W 24/10* (2009.01)
*H04W 72/23* (2023.01)

(56) References Cited

U.S. PATENT DOCUMENTS

| | | | |
|---|---|---|---|
| 2012/0208541 A1 | 8/2012 | Luo et al. | |
| 2013/0235783 A1* | 9/2013 | Wang | H04W 4/06 370/312 |
| 2013/0308473 A1* | 11/2013 | Sun | H04W 36/30 370/252 |
| 2013/0329660 A1 | 12/2013 | Noh | |
| 2014/0112184 A1 | 4/2014 | Chai | |
| 2015/0163719 A1* | 6/2015 | Lim | H04W 36/38 455/438 |
| 2016/0050680 A1* | 2/2016 | Simonsson | H04W 72/085 370/329 |
| 2016/0165471 A1* | 6/2016 | Bontu | H04L 1/0026 370/241 |
| 2016/0254886 A1* | 9/2016 | Bontu | H04L 5/0073 455/452.1 |
| 2016/0285602 A1* | 9/2016 | Fang | H04W 52/244 |
| 2017/0347270 A1* | 11/2017 | Iouchi | H04W 72/0446 |
| 2019/0101615 A1* | 4/2019 | Ten | G01S 5/0045 |
| 2019/0260487 A1* | 8/2019 | Kazmi | H04B 17/382 |
| 2020/0245324 A1 | 7/2020 | Kim et al. | |
| 2020/0260503 A1* | 8/2020 | Bienas | H04W 76/15 |
| 2020/0383089 A1* | 12/2020 | Goto | H04W 72/04 |
| 2021/0084618 A1* | 3/2021 | Bienas | H04L 1/1812 |
| 2022/0060297 A1* | 2/2022 | Tomeba | H04B 7/063 |
| 2022/0216964 A1* | 7/2022 | Mondal | H04J 11/0053 |
| 2022/0394614 A1* | 12/2022 | Hwang | H04W 52/0216 |

* cited by examiner

SINGLE FREQUENCY NETWORK TRANSMISSION PROCEDURE BASED ON SOUNDING REFERENCE SIGNALS

CROSS REFERENCE

The present Application for Patent claims the benefit of U.S. Provisional Patent Application No. 62/940,161 by PARK et al., entitled "SINGLE FREQUENCY NETWORK TRANSMISSION PROCEDURE BASED ON SOUNDING REFERENCE SIGNALS," filed Nov. 25, 2019, assigned to the assignee hereof, and expressly incorporated herein.

BACKGROUND

The following relates generally to wireless communications and more specifically to a single frequency network (SFN) transmission procedure based on sounding reference signals (SRSs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, multiple cells at one or more base stations may synchronously transmit downlink data to a UE to improve the chances that the downlink data is received by the UE. The multiple cells may be a part of an SFN, and the synchronous transmission of the downlink data from the multiple cells may be referred to as an SFN transmission. Improved techniques for facilitating SFN transmissions to a UE from multiple cells may be desirable.

SUMMARY

The described techniques relate to improved methods, systems, devices, and apparatuses that support a single frequency network (SFN) transmission procedure based on sounding reference signals (SRSs). Generally, the described techniques at a serving cell and one or more neighbor cells provide for identifying suitable configurations for an SFN transmission to a user equipment (UE) to improve throughput in a wireless communications system. A serving cell may configure one or more neighbor cells to perform measurements on SRSs received from a UE. The serving cell and a subset of the one or more neighbor cells may then transmit data to the UE in an SFN transmission based on the SRS measurements. For instance, the serving cell may determine whether to add each of the one or more neighbor cells to an SFN cell group for an SFN transmission to a UE based on measurements performed by the neighbor cell on SRSs received from the UE. Additionally, or alternatively, a neighbor cell of the one or more neighbor cells may determine which beam to use for an SFN transmission to a UE based on measurements performed by the neighbor cell on SRSs received from the UE.

A method of wireless communication at a first cell is described. The method may include transmitting a control message to a UE indicating that the UE is to transmit sounding reference signals, transmitting, based on transmitting the control message, a measurement request to one or more second cells capable of transmitting a single frequency network transmission to the UE with the first cell, the measurement request indicating for the one or more second cells to perform measurements on the sounding reference signals, and transmitting the single frequency network transmission to the UE based on transmitting the measurement request.

An apparatus for wireless communication at a first cell is described. The apparatus may include a processor, memory coupled with the processor, and instructions stored in the memory. The instructions may be executable by the processor to cause the apparatus to transmit a control message to a UE indicating that the UE is to transmit sounding reference signals, transmit, based on transmitting the control message, a measurement request to one or more second cells capable of transmitting a single frequency network transmission to the UE with the first cell, the measurement request indicating for the one or more second cells to perform measurements on the sounding reference signals, and transmit the single frequency network transmission to the UE based on transmitting the measurement request.

Another apparatus for wireless communication at a first cell is described. The apparatus may include means for transmitting a control message to a UE indicating that the UE is to transmit sounding reference signals, transmitting, based on transmitting the control message, a measurement request to one or more second cells capable of transmitting a single frequency network transmission to the UE with the first cell, the measurement request indicating for the one or more second cells to perform measurements on the sounding reference signals, and transmitting the single frequency network transmission to the UE based on transmitting the measurement request.

A non-transitory computer-readable medium storing code for wireless communication at a first cell is described. The code may include instructions executable by a processor to transmit a control message to a UE indicating that the UE is to transmit sounding reference signals, transmit, based on transmitting the control message, a measurement request to one or more second cells capable of transmitting a single frequency network transmission to the UE with the first cell, the measurement request indicating for the one or more second cells to perform measurements on the sounding reference signals, and transmit the single frequency network transmission to the UE based on transmitting the measurement request.

Some examples of the method, apparatuses, and non-transitory computer-readable medium described herein may further include operations, features, means, or instructions for receiving, from a second cell of the one or more second cells, a measurement report indicating a result of the measurements performed by the second cell on the sounding reference signals. Some examples of the method, apparatuses, and non-transitory computer-readable medium described herein may further include operations, features, means, or instructions for adding the second cell to a single frequency network cell group for the single frequency network transmission based on the measurement report, transmitting, to the second cell, a request for the second cell to transmit the single frequency network transmission to the UE with the first cell, and transmitting the single frequency network transmission to the UE with the second cell. Some examples of the method, apparatuses, and non-transitory computer-readable medium described herein may further include operations, features, means, or instructions for excluding the second cell from a single frequency network cell group for the single frequency network transmission based on the measurement report.

Some examples of the method, apparatuses, and non-transitory computer-readable medium described herein may further include operations, features, means, or instructions for transmitting, to the one or more second cells, a request for the one or more second cells to transmit the single frequency network transmission to the UE with the first cell. Some examples of the method, apparatuses, and non-transitory computer-readable medium described herein may further include operations, features, means, or instructions for transmitting, to the UE, an indication of one or more synchronization signal blocks to be transmitted by a second cell of the one or more second cells, and receiving, from the UE, a result of measurements performed by the UE on the one or more synchronization signal blocks transmitted by the second cell.

Some examples of the method, apparatuses, and non-transitory computer-readable medium described herein may further include operations, features, means, or instructions for adding the second cell to a single frequency network cell group for the single frequency network transmission based on the measurements performed by the UE on the one or more synchronization signal blocks transmitted by the second cell, transmitting, to the second cell, a request for the second cell to transmit the single frequency network transmission to the UE with the first cell, and transmitting the single frequency network transmission to the UE with the second cell. Some examples of the method, apparatuses, and non-transitory computer-readable medium described herein may further include operations, features, means, or instructions for excluding the second cell from a single frequency network cell group for the single frequency network transmission based on the measurements performed by the UE on the one or more synchronization signal blocks transmitted by the second cell.

Some examples of the method, apparatuses, and non-transitory computer-readable medium described herein may further include operations, features, means, or instructions for transmitting, in the measurement request to the second cell, an index of a synchronization signal block selected by the UE based on the measurements performed by the UE on the one or more synchronization signal blocks transmitted by the second cell. Some examples of the method, apparatuses, and non-transitory computer-readable medium described herein may further include operations, features, means, or instructions for transmitting, to the UE, downlink control information including a transmission configuration indicator indicating a receive beam corresponding to a synchronization signal block of the first cell for the UE to use to receive the single frequency network transmission. In some examples of the method, apparatuses, and non-transitory computer-readable medium described herein, the measurement request includes a set of time-frequency resources used to transmit the sounding reference signals, a period of the sounding reference signals, a repetition number of the sounding reference signals, or a combination thereof.

A method of wireless communication at a second cell is described. The method may include receiving, from a first cell capable of transmitting a single frequency network transmission to a UE with the second cell, a measurement request indicating that the second cell is to perform measurements on sounding reference signals received from the UE, receiving the sounding reference signals from the UE based on the received measurement request, performing the measurements on the sounding reference signals received from the UE, and transmitting the single frequency network transmission to the UE based on the measurements.

An apparatus for wireless communication at a second cell is described. The apparatus may include a processor, memory coupled with the processor, and instructions stored in the memory. The instructions may be executable by the processor to cause the apparatus to receive, from a first cell capable of transmitting a single frequency network transmission to a UE with the second cell, a measurement request indicating that the second cell is to perform measurements on sounding reference signals received from the UE, receive the sounding reference signals from the UE based on the received measurement request, perform the measurements on the sounding reference signals received from the UE, and transmit the single frequency network transmission to the UE based on the measurements.

Another apparatus for wireless communication at a second cell is described. The apparatus may include means for receiving, from a first cell capable of transmitting a single frequency network transmission to a UE with the second cell, a measurement request indicating that the second cell is to perform measurements on sounding reference signals received from the UE, receiving the sounding reference signals from the UE based on the received measurement request, performing the measurements on the sounding reference signals received from the UE, and transmitting the single frequency network transmission to the UE based on the measurements.

A non-transitory computer-readable medium storing code for wireless communication at a second cell is described. The code may include instructions executable by a processor to receive, from a first cell capable of transmitting a single frequency network transmission to a UE with the second cell, a measurement request indicating that the second cell is to perform measurements on sounding reference signals received from the UE, receive the sounding reference signals from the UE based on the received measurement request, perform the measurements on the sounding reference signals received from the UE, and transmit the single frequency network transmission to the UE based on the measurements.

Some examples of the method, apparatuses, and non-transitory computer-readable medium described herein may further include operations, features, means, or instructions for transmitting, to the first cell, a measurement report indicating a result of the measurements performed by the second cell on the sounding reference signals. Some examples of the method, apparatuses, and non-transitory computer-readable medium described herein may further include operations, features, means, or instructions for receiving, from the first cell, a request for the second cell to transmit the single frequency network transmission to the UE with the first cell based on the measurement report, and transmitting the single frequency network transmission to the UE with the first cell based on receiving the request.

In some examples of the method, apparatuses, and non-transitory computer-readable medium described herein, performing the measurements on the sounding reference signals received from the UE may include operations, features, means, or instructions for receiving the sounding reference signals on a first set of beams associated with a set of synchronization signal blocks, and performing the measurements on the sounding reference signals received on the first set of beams. In some examples of the method, apparatuses, and non-transitory computer-readable medium described herein, the measurement report includes an index of a synchronization signal block corresponding to a first beam selected from the first set of beams based on the measurements performed by the second cell on the sounding reference signals, an indication of a received power of the sounding reference signals on the first beam, or a combination thereof.

Some examples of the method, apparatuses, and non-transitory computer-readable medium described herein may further include operations, features, means, or instructions for receiving, from the first cell, a request for the second cell to transmit the single frequency network transmission to the UE with the first cell, and transmitting the single frequency network transmission to the UE with the first cell based on the measurements performed by the second cell on the sounding reference signals. In some examples of the method, apparatuses, and non-transitory computer-readable medium described herein, performing the measurements on the sounding reference signals received from the UE may include operations, features, means, or instructions for receiving the sounding reference signals on a first set of beams, each beam of the first set of beams associated with a synchronization signal block, and performing the measurements on the sounding reference signals received on the first set of beams.

Some examples of the method, apparatuses, and non-transitory computer-readable medium described herein may further include operations, features, means, or instructions for transmitting one or more synchronization signal blocks, receiving, based on transmitting the one or more synchronization signal blocks, an index of a synchronization signal block of the one or more synchronization signal blocks in the measurement request, the synchronization signal block selected by the UE based on the measurements performed by the UE on the one or more synchronization signal blocks, and receiving, from the first cell, a request for the second cell to transmit the single frequency network transmission to the UE with the first cell based on receiving the index of the synchronization signal block.

Some examples of the method, apparatuses, and non-transitory computer-readable medium described herein may further include operations, features, means, or instructions for receiving the sounding reference signals on a second set of beams, each beam of the second set of beams associated with a channel state information reference signal, and the second set of beams being associated with the synchronization signal block, performing the measurements on the sounding reference signals received on the second set of beams, selecting a beam of the second set of beams to use to transmit the single frequency network transmission to the UE with the first cell based on the measurements performed on the sounding reference signals received on each of the second set of beams, and transmitting the single frequency network transmission to the UE with the first cell on the selected beam. In some examples of the method, apparatuses, and non-transitory computer-readable medium described herein, the measurement request includes a set of time-frequency resources used to transmit the sounding reference signals, a period of the sounding reference signals, a repetition number of the sounding reference signals, or a combination thereof.

DETAILED DESCRIPTION

In some wireless communications systems, multiple cells at one or more base stations may synchronously transmit downlink data to a user equipment (UE) to improve the chances that the downlink data is received by the UE. The multiple cells may include a serving cell and one or more neighbor cells that are a part of a single frequency network (SFN) or may be in an SFN cell group, and the synchronous transmission of the downlink data from the multiple cells may be referred to as an SFN transmission. In some cases, the multiple cells may be configured to use beamforming for the SFN transmission, and it may be appropriate for each cell to identify a transmit beam to transmit downlink signals to the UE. In such cases, however, because the SFN transmission may be synchronous (e.g., transmitted by the serving cell and the one or more neighbor cells at the same time), the UE may use a single receive beam to receive the downlink data from the serving cell and the one or more neighbor cells. As a result, neighboring cells may have difficulty identifying a suitable transmit beam for the SFN transmission (e.g., since the receive beam used by the UE may not be a best receive beam for receiving signals from each neighbor cell).

As described herein, a serving cell and one or more neighbor cells may support efficient techniques for identifying suitable configurations for an SFN transmission to a UE to improve throughput in a wireless communications system. A serving cell may transmit a control message to a UE indicating that the UE is to transmit sounding reference signals (SRSs), and the serving cell may configure one or more neighbor cells to perform measurements on the SRSs from the UE. The serving cell and a subset of the one or more neighbor cells may then transmit data to the UE in an SFN transmission based on the SRS measurements. For instance, the serving cell may determine whether to add each of the one or more neighbor cells to an SFN cell group for an SFN transmission to a UE based on the measurements performed by the neighbor cell on SRSs received from the UE. Additionally, or alternatively, a neighbor cell of the one or more neighbor cells may determine which beam to use for an SFN transmission to a UE based on the measurements performed by the neighbor cell on SRSs received from the UE.

Aspects of the disclosure introduced above are described herein in the context of a wireless communications system. Examples of processes and signaling exchanges that support an SFN transmission procedure based on SRSs are then described. Aspects of the disclosure are further illustrated by and described with reference to apparatus diagrams, system diagrams, and flowcharts that relate to an SFN transmission procedure based on SRSs.

Figure 1:
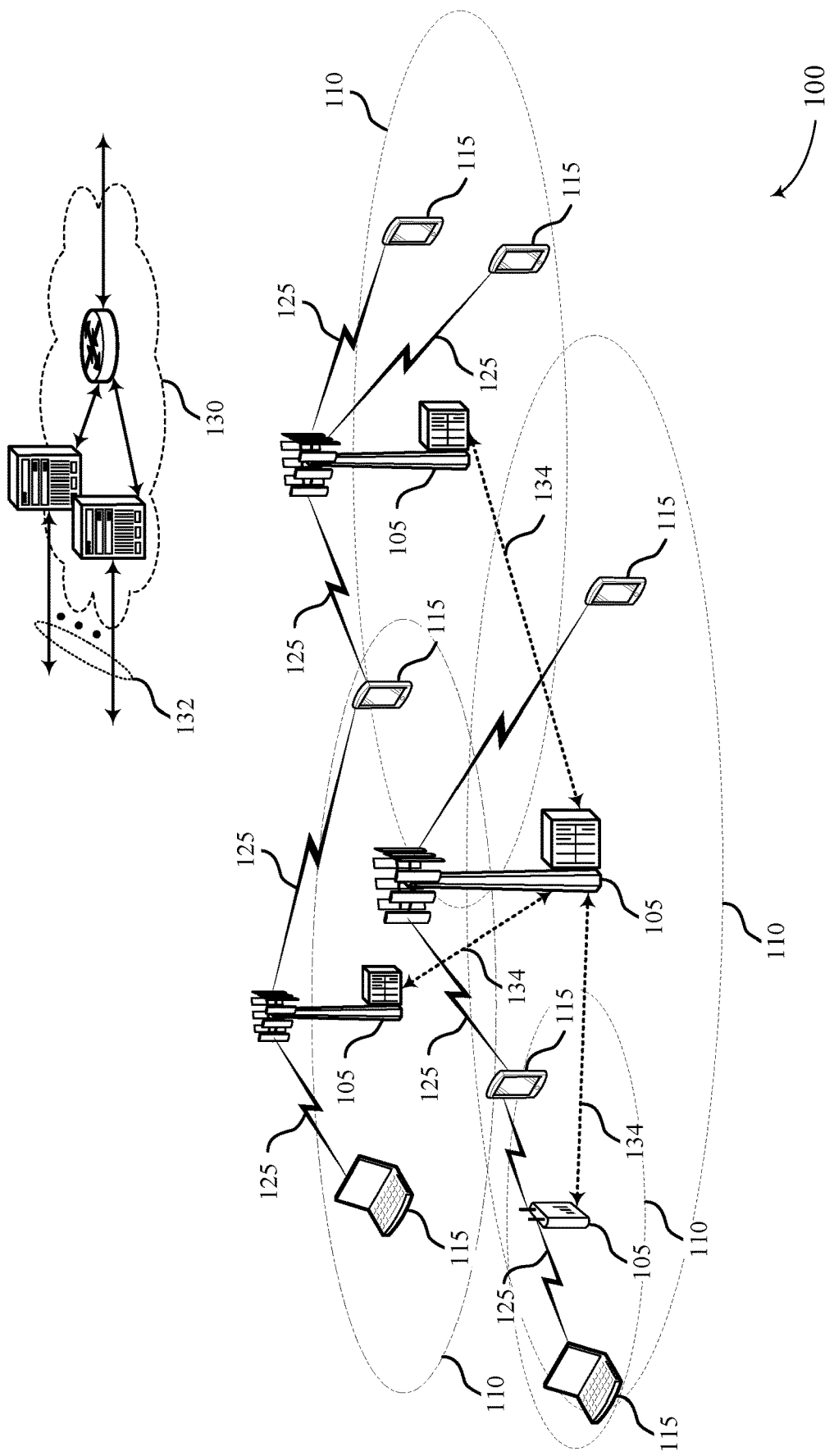
FIG. 1 illustrates an example of a wireless communications system that supports single frequency network (SFN) transmission procedures based on sounding reference signals (SRSs) in accordance with aspects of the present disclosure.

FIG. 1 illustrates an example of a wireless communications system 100 that supports an SFN transmission procedure based on SRSs in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighbor cells (e.g., a physical cell identifier (PCI), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometer (km)) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, multiple cells at one or more base stations 105 may synchronously transmit downlink data to a UE 115 to improve the chances that the downlink data is received by the UE 115. The multiple cells may include a serving cell and one or more neighbor cells that are a part of an SFN or may be in an SFN cell group, and the synchronous transmission of the downlink data from the multiple cells may be referred to as an SFN transmission. Further, a cell in an SFN may be referred to as an SFN cell, and an SFN cell may include transmitters and receivers for sending and receiving control and data signals over a single frequency channel.

Figure 2:
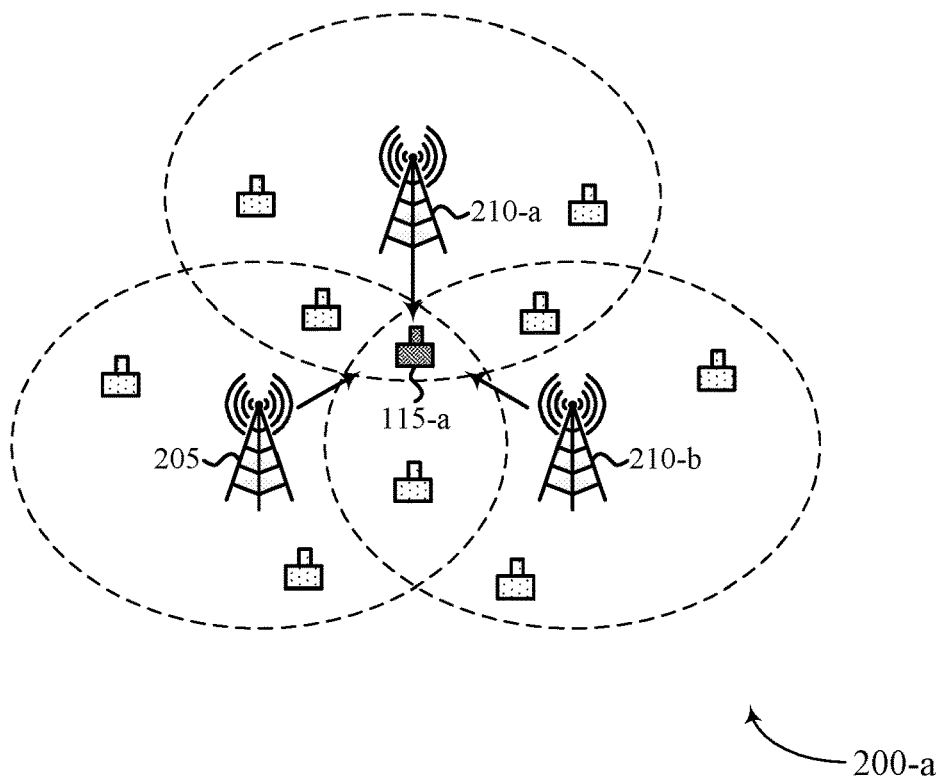
FIG. 2 illustrates examples of SFNs in accordance with aspects of the present disclosure.
Figure 2:
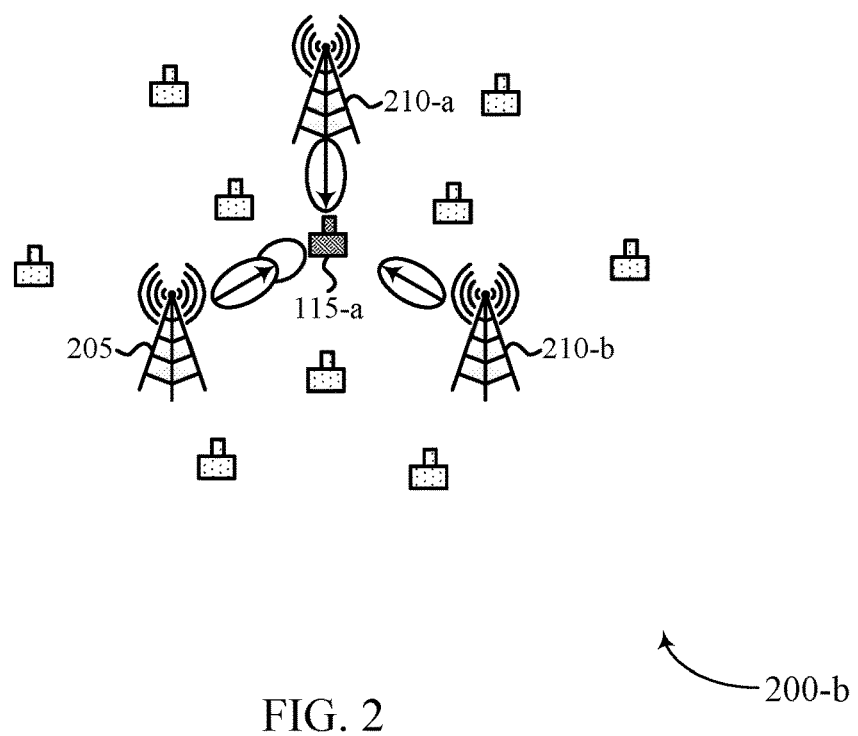

FIG. 2 illustrates an example of SFNs 200 in accordance with aspects of the present disclosure. In a first example 200-a (e.g., in an LTE system), an associated serving cell 205, a first neighbor cell 210-a, and a second neighbor cell 210-b may transmit the same data in every direction (e.g., omni-directional) such that the data may be received by the UE 115-a. In this example, the SFN may be referred to as a multicast or broadcast SFN (MBSFN), and no analog transmit beamforming may be used at the cells at the one or more base stations 105. In a second example 200-b, the associated serving cell 205, the first neighbor cell 210-a, and the second neighbor cell 210-b may each transmit the same data in a specific direction using analog beamforming to the UE 115-a. In this example, because the SFN transmission may be synchronous (e.g., transmitted by the serving cell 205, the first neighbor cell 210-a, and the second neighbor cell 210-b at the same time), the UE 115-a may use a single receive beam to receive the SFN transmission. For instance, the UE 115-a may use a single receive beam to receive the SFN transmissions due to implementation limitations. As a result, neighbor cell 210 may have difficulty identifying a suitable transmit beam for the SFN transmission (e.g., if there is no beam coordination between cells).

As described herein, a serving cell 205 and one or more neighbor cells 210 may support efficient techniques for identifying suitable configurations for an SFN transmission to a UE 115 to improve throughput in a wireless communications system 100. A serving cell 205 may transmit a control message to a UE 115 indicating that the UE 115 is to transmit SRSs, and the serving cell 205 may configure one or more neighbor cells 210 to perform measurements on the SRSs received from the UE 115. The serving cell 205 and a subset of the one or more neighbor cells 210 may then transmit data to the UE 115 in an SFN transmission based on the SRS measurements. For instance, the serving cell 205 may determine whether to add each of the one or more neighbor cells 210 to an SFN cell group for an SFN transmission to a UE 115 based on the measurements performed by each neighbor cell 210 on SRSs received from the UE 115. Additionally, or alternatively, a neighbor cell 210 of the one or more neighbor cells 210 may determine which beam to use for an SFN transmission to a UE 115 based on the measurements performed by the neighbor cell 210 on SRSs received from the UE 115.

In one example, a serving cell 205 may configure a neighbor cell 210 to report measurements performed on SRSs received from a UE 115, and the serving cell 205 may add or exclude the neighbor cell 210 from an SFN group for an SFN transmission to the UE 115 based on the reported measurements. In another example, a serving cell 205 may configure a neighbor cell 210 to perform measurements on SRSs received from a UE 115, and the neighbor cell 210 may decide whether to participate in an SFN transmission to the UE 115 based on the measurements performed on the SRSs. In yet another example, a serving cell 205 may determine whether to add a neighbor cell 210 to an SFN cell group for an SFN transmission to a UE 115 based on measurements performed by the UE 115 on signals (e.g., synchronization signal blocks (SSBs)) transmitted by the neighbor cell 210. Once a neighbor cell 210 is added to the SFN cell group, the serving cell 205 may configure the neighbor cell 210 to perform measurements on SRSs received from the UE 115, and the neighbor cell 210 may identify a suitable beam for the SFN transmission to the UE 115 based on the measurements performed on the SRSs.

Figure 3:
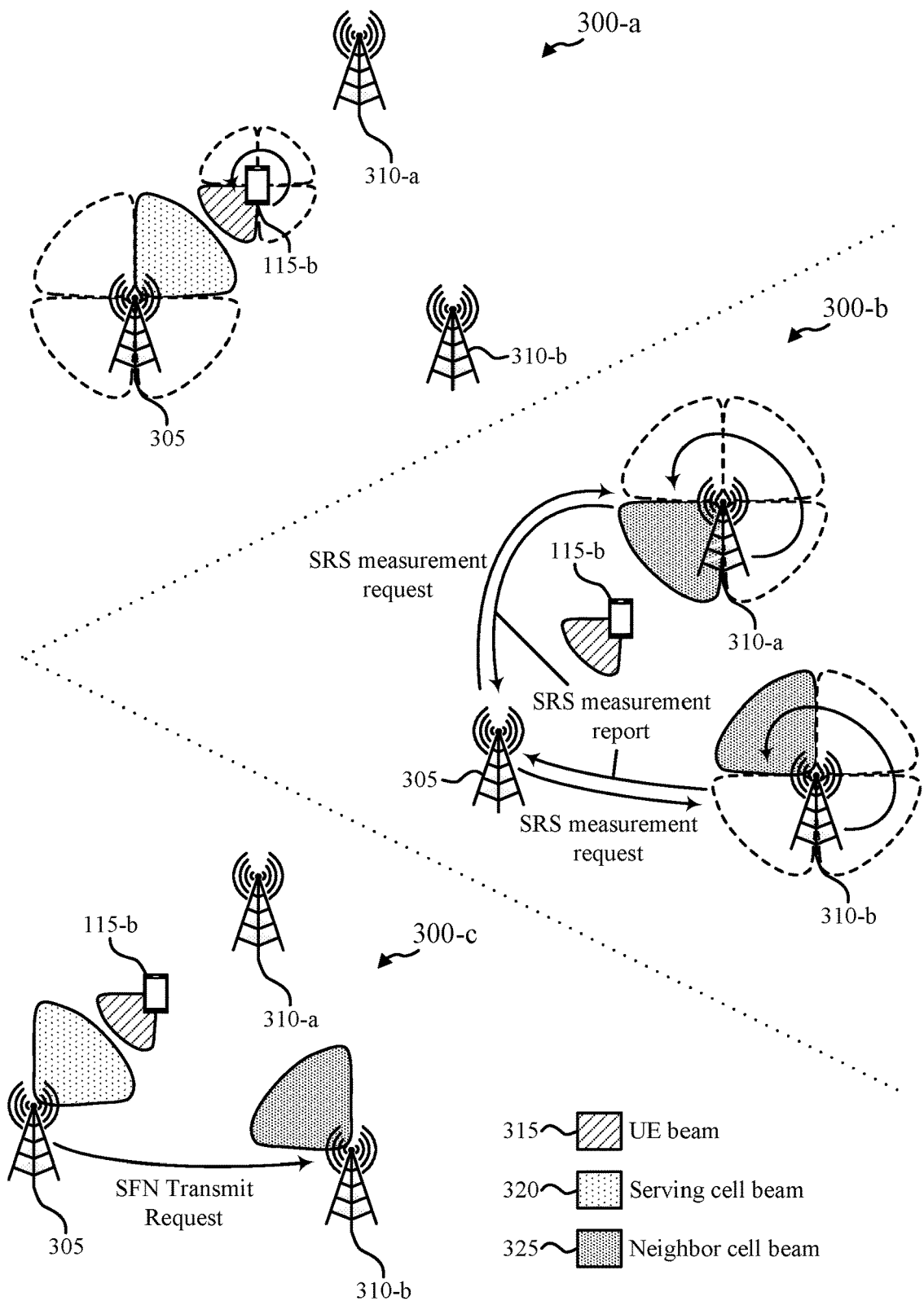
FIG. 3 illustrates an example of communications between a serving cell, a first neighbor cell, a second neighbor cell, and a user equipment (UE) as part of an SFN transmission procedure based on SRSs in accordance with aspects of the present disclosure.

FIG. 3 illustrates an example of communications between a serving cell 305 (e.g., PCI 0), a neighbor cell 310-a (e.g., PCI 1), a neighbor cell 310-b (e.g., PCI 2), and a UE 115-b as part of an SFN transmission procedure based on SRSs in accordance with aspects of the present disclosure. At 300-a, the UE 115-b may perform an initial access procedure to gain access to the serving cell 305 and a beam selection procedure to select a beam for communications with the serving cell 305. As part of the beam selection procedure, the UE 115-b may monitor for SSBs from the serving cell 305 and may select a beam for communicating with the serving cell 305 based on the SSBs. For instance, the serving cell 305 may transmit multiple (e.g., four) SSBs on multiple (e.g., four) wide beams (e.g., transmit beams) at the serving cell 305 (i.e., the serving cell 305 may perform beam sweeping when transmitting the SSBs), and the UE 115-b may receive each of the multiple SSBs on multiple wide beams (e.g., receive beams) at the UE 115-b (i.e., the UE 115-b may perform beam sweeping when receiving the SSBs).

The UE 115-b may then perform measurements on the SSBs, and the UE 115-b may determine that the SSB transmitted on a serving cell beam 320 (e.g., a transmit beam) and received on the UE beam 315 (e.g., receive beam) is associated with the best measurements. In particular, the UE 115-b may determine that measurements (e.g., received power, received quality, or signal to interference plus noise ratio (SINR)) performed on the SSB transmitted on the serving cell beam 320 and received on the UE beam 315 is higher than the same measurements performed on SSBs received on other beams at the UE 115-b and higher than the same measurements performed on other SSBs received on the UE beam 315. Thus, the UE 115-b may select the UE beam 315 for communicating with the serving cell 305, and the serving cell 305 may select the serving cell beam 320 for communicating with the UE 115-b (e.g., based on the UE 115-b indicating the index of the SSB transmitted on the serving cell beam 320 to the serving cell 305). That is, a best transmit beam at the serving cell 305 and a best receive beam at the UE 115-b may be determined via SSB beam sweeping in the serving cell 305 (e.g., normal P1 operation).

At 300-b, the serving cell 305 may transmit a request to the UE 115-b for the UE 115-b to transmit SRSs. For instance, the serving cell 305 may transmit an SRS configuration message to the UE 115-b requesting that the UE 115-b sends SRSs. The SRS configuration message may include spatial relation information with an index of the SSB (e.g., SSB 0) transmitted on the serving cell beam 320 associated with the best measurements in the beam selection procedure (e.g., to indicate that the UE 115-b is to use the UE beam 315 to transmit the SRSs). Thus, the UE 115-b may use the UE beam 315 to transmit the SRSs (e.g., SRS transmission by using the beam associated with the selected SSB of the serving cell 305). That is, the beam used to transmit the SRSs (e.g., SRS transmit beam) may be the same as the receive beam associated with the SSB 0 of PCI 0.

The serving cell 305 may then transmit an SRS measurement request to the neighbor cell 310-a and the neighbor cell 310-b requesting that the neighbor cell 310-a and the neighbor cell 310-b perform measurements on SRSs received from the UE 115-b. The UE 115-b may transmit the same SRS repeatedly over time (e.g., during multiple slots or OFDM symbols) to allow neighbor cells 310 to select the best receive beam with receive beam sweeping. The serving cell 305 may also send (e.g., in the SRS measurement request) information about the SRSs to be transmitted by the UE 115-b. The information about the SRSs may include the set of time-frequency resources to be used to transmit the SRSs (e.g., SRS location), the periodicity with which the SRSs are to be transmitted (e.g., SRS period), the number of SRS transmissions (e.g., SRS repetition number), etc.

Thus, each of the neighbor cell 310-*a* and the neighbor cell 310-*b* may receive the SRSs on multiple beams (e.g., wide beams each associated with an SSB) and may perform measurements on the SRSs received on each of the multiple beams. That is, the neighbor cells 310 may measure the SRSs by sweeping receive beams associated with SSBs and report the measurements to the serving cell 305. The measurements reported by a neighbor cell 310 may include a best SSB index corresponding to a best beam at the neighbor cell 310, a corresponding received power with which the SRSs are received on the best beam at the neighbor cell 310, etc. For example, the neighbor cell 310 may perform measurements on the SRSs received from the UE 115-*b*, and the neighbor cell 310 may determine that the SRSs received on a neighbor cell beam 325 (e.g., receive beam) is associated with the best measurements.

In particular, the neighbor cell 310 may determine that measurements (e.g., received power, received quality, or SINR) performed on the SRSs received on the neighbor cell beam 325 is higher than the same measurements performed on SRSs received on other beams at the neighbor cell 310. Thus, the neighbor cell 310 may select the neighbor cell beam 325 for communicating with the UE 115-*b* (e.g., transmitting data to the UE 115-*b* in an SFN transmission), and the neighbor cell 310 may transmit the measurement report to the serving cell 305 based on selecting the neighbor cell beam 325. The neighbor cell 310 may transmit the index of the SSB associated with the neighbor cell beam 325 in the measurement report (e.g., where the neighbor cell beam 325 is used to transmit the SSB with the indicated index), and the neighbor cell 310 may transmit the measurements (e.g., received power) performed on SRSs received on the neighbor cell beam 325 in the measurement report.

The serving cell 305 may receive the SRS measurement reports from the neighbor cell 310-*a* and the neighbor cell 310-*b*, and the serving cell 305 may select the neighbor cells 310 to be included in an SFN cell group for an SFN transmission to the UE 115-*b* based on the measurement reports received form the neighbor cells 310. That is, the neighbor cells 310 may report the SRS measurements to the serving cell 305, and the serving cell 305 may decide on the UE-specific SFN cell group. In the example of FIG. 3, the serving cell 305 may determine that the measurements reported by the neighbor cell 310-*b* satisfy one or more thresholds (e.g., the reported received power, received quality, or SINR is above a threshold). Thus, the serving cell 305 may add the neighbor cell 310-*b* to the SFN cell group for the SFN transmission. In addition, the serving cell 305 may determine that the measurements reported by the neighbor cell 310-*a* fail to satisfy one or more thresholds (e.g., the reported received power, received quality, or SINR is below a threshold). Thus, the serving cell 305 may exclude the neighbor cell 310-*a* from the SFN cell group for the SFN transmission.

At 300-*c*, the serving cell 305 may transmit an SFN transmit request to the neighbor cell 310-*b* for the SFN transmission based on adding the neighbor cell 310-*b* to the SFN cell group for the SFN transmission (e.g., SRS transmission by using the beam associated with the selected SSB of the serving cell 305). That is, the serving cell 305 may request for each neighbor cell 310 in the SFN cell group to transmit SFN data in the SFN transmission using a best beam selected by the neighbor cell 310 based on the SRS measurements at 300-*b*. The serving cell 305 and the neighbor cell 310-*b* may then transmit the SFN data in the SFN transmission synchronously (e.g., at the same time). The serving cell 305 may use the serving cell beam 320 selected in the beam selection procedure at 300-*a* for the SFN transmission (e.g., quasi co-located with SSB 0 at PCI 0), and the neighbor cell 310 may use the neighbor cell beam 325 selected as the best beam based on the SRS measurements at 300-*b* for the SFN transmission (e.g., quasi co-located with SSB 1 at PCI 2). The serving cell 305 may transmit downlink control information (DCI) to the UE 115-*b* including a transmission configuration indicator (TCI) associated with the SSB of the serving cell beam 320. For instance, the TCI may include quasi co-location information in a TCI state that corresponds to an SSB index of SSB 0 (i.e., the receive beam associated with SSB 0 of PCI 0). Thus, the UE 115-*b* may use the UE beam 315 corresponding to the serving cell beam 320 (e.g., a receive beam corresponding to the SSB of the serving cell 305 indicated by the TCI) to receive the SFN transmission from the serving cell 305 and the neighbor cell 310-*b*.

Figure 4:
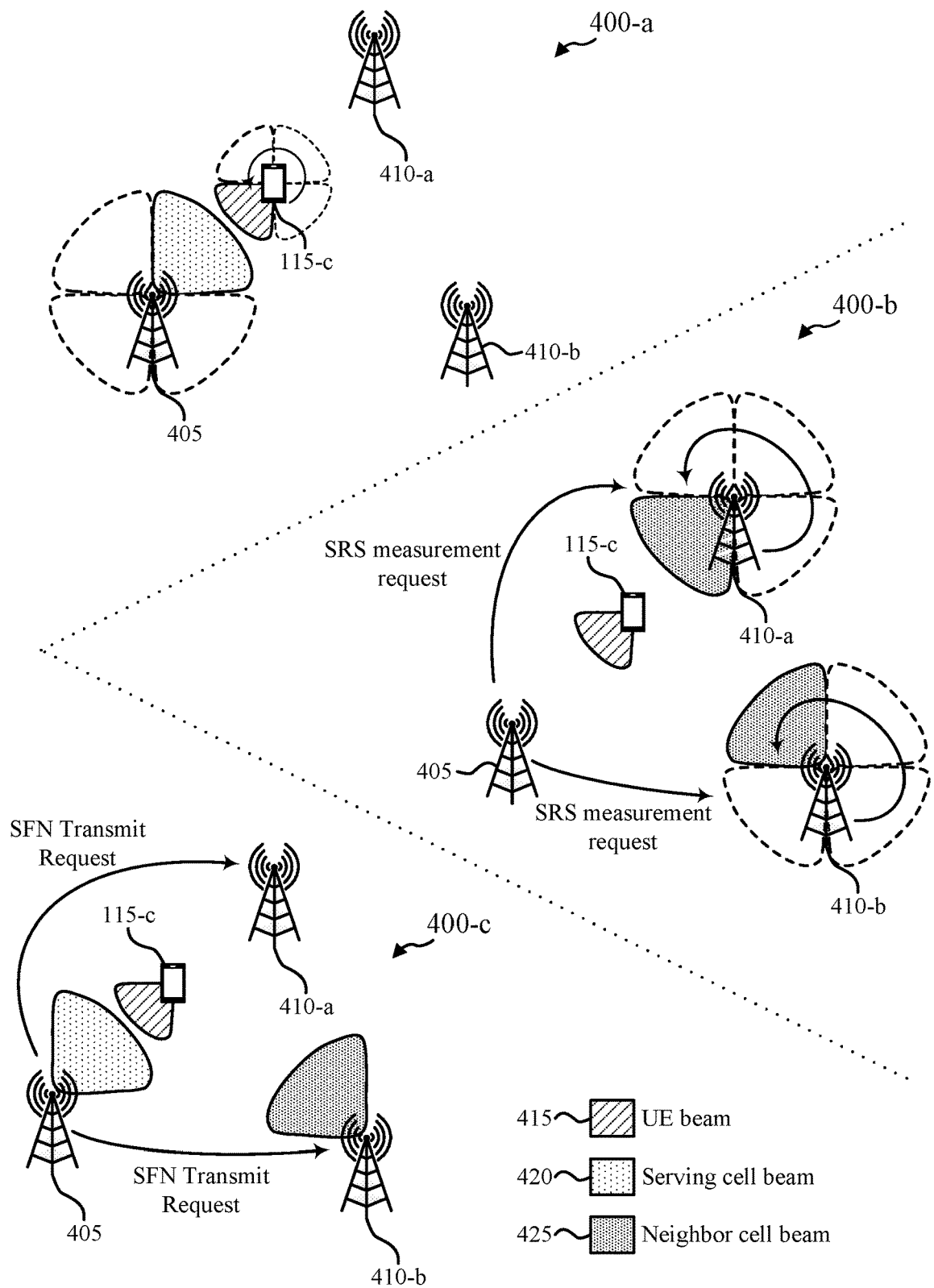
FIG. 4 illustrates an example of communications between a serving cell, a first neighbor cell, a second neighbor cell, and a UE as part of an SFN transmission procedure based on SRSs in accordance with aspects of the present disclosure.

FIG. 4 illustrates an example of communications between a serving cell 405 (e.g., PCI 0), a neighbor cell 410-*a* (e.g., PCI 1), a neighbor cell 410-*b* (e.g., PCI 2), and a UE 115-*c* as part of an SFN transmission procedure based on SRSs in accordance with aspects of the present disclosure. At 400-*a*, the UE 115-*c* may perform an initial access procedure to gain access to the serving cell 405 and a beam selection procedure to select a beam for communications with the serving cell 405. As part of the beam selection procedure, the UE 115-*c* may monitor for SSBs from the serving cell 405 and may select a beam for communicating with the serving cell 405 based on the SSBs. For instance, the serving cell 405 may transmit four SSBs on four wide beams (e.g., transmit beams) at the serving cell 405 (i.e., the serving cell 405 may perform beam sweeping when transmitting the SSBs), and the UE 115-*c* may receive each of the four SSBs on four wide beams (e.g., receive beams) at the UE 115-*c* (i.e., the UE 115-*c* may perform beam sweeping when receiving the SSBs).

The UE 115-*c* may then perform measurements on the SSBs, and the UE 115-*c* may determine that the SSB transmitted on a serving cell beam 420 (e.g., a transmit beam) and received on the UE beam 415 (e.g., a receive beam) is associated with the best measurements. In particular, the UE 115-*c* may determine that measurements (e.g., received power, received quality, or signal to interference plus noise ratio (SINR)) performed on the SSB transmitted on the serving cell beam 420 and received on the UE beam 415 is higher than the same measurements performed on SSBs (e.g., all SSBs) received on other beams at the UE 115-*c* and higher than the same measurements performed on other SSBs received on the UE beam 415. Thus, the UE 115-*c* may select the UE beam 415 for communicating with the serving cell 405, and the serving cell 405 may select the serving cell beam 420 for communicating with the UE 115-*c* (e.g., based on the UE 115-*c* indicating the index of the SSB transmitted on the serving cell beam 420 to the serving cell 405). That is, a best transmit beam at the serving cell 405 and a best receive beam at the UE 115-*c* may be determined via SSB beam sweeping in the serving cell 405 (e.g., normal P1 operation).

At 400-*b*, the serving cell 405 may transmit a request to the UE 115-*c* for the UE 115-*c* to transmit SRSs. For instance, the serving cell 405 may transmit an SRS configuration message to the UE 115-*c* requesting that the UE 115-*c* sends SRSs. The SRS configuration message may include spatial relation information with an index of the SSB (e.g., SSB 0) transmitted on the serving cell beam 420 associated with the best measurements in the beam selection procedure (e.g., to indicate that the UE 115-c is to use the UE beam 415 to transmit the SRSs). Thus, the UE 115-c may use the UE beam 415 to transmit the SRSs since the UE beam 415 is associated with the best measurements for receiving the SSB transmitted on the serving cell beam 420 (e.g., SRS transmission by using the beam associated with the selected SSB of the serving cell 405). That is, the beam used to transmit the SRSs (e.g., SRS transmit beam) may be the same as the receive beam associated with the SSB 0 of PCI 0. In particular, the UE 115-c may transmit the SRSs using the transmit beam that is the same as the receive beam associated with the SSB 0.

The serving cell 405 may then transmit an SRS measurement request to the neighbor cell 410-a and the neighbor cell 410-b requesting that the neighbor cell 410-a and the neighbor cell 410-b perform measurements on SRSs received from the UE 115-c. The UE 115-c may transmit the same SRS repeatedly over time (e.g., during multiple slots or OFDM symbols) to allow neighbor cells 410 to select the best receive beam with receive beam sweeping. The serving cell 405 may also send (e.g., in the SRS measurement request) information about the SRSs to be transmitted by the UE 115-c. The information about the SRSs may include the set of time-frequency resources to be used to transmit the SRSs (SRS location), the periodicity with which the SRSs are to be transmitted (SRS period), the number of SRS transmissions (SRS repetition number), etc.

Thus, each of the neighbor cell 410-a and the neighbor cell 410-b may receive the SRSs on multiple beams (e.g., wide beams each associated with an SSB) and may perform measurements on the SRSs received on each of the multiple beams. That is, the neighbor cells 410 may measure the SRSs by sweeping receive beams associated with SSBs. Each neighbor cell 410 may then determine that the SRSs received on a neighbor cell beam 425 at the neighbor cell 410 (e.g., a receive beam) is associated with the best measurements. In particular, the neighbor cell 410 may determine that measurements (e.g., received power, received quality, or SINR) performed on the SRSs received on the neighbor cell beam 425 is higher than the same measurements performed on SRSs received on other beam at the neighbor cell 410. Thus, the neighbor cell 410 may select the neighbor cell beam 425 for communicating with the UE 115-c (e.g., transmitting data to the UE 115-c in an SFN transmission).

At 400-c, the serving cell 405 may then transmit an SFN transmit request to the neighbor cell 410-a and the neighbor cell 410-b for an SFN transmission, and the neighbor cell 410-a and the neighbor cell 410-b may determine whether to participate in the SFN transmission with the serving cell 405 based on the measurements performed on the SRSs received on the neighbor cell beam 425 (e.g., the beam associated with the best SRS measurements at the neighbor cell 410). That is, the serving cell 405 may request for all the neighbor cells 410 (e.g., in a neighbor cell list at the serving cell 405) to transmit SFN data using a best beam selected by each neighbor cell 410 based on the SRS measurements at 400-b. Accordingly, each neighbor cell 410 may determine whether to join an SFN cell group for an SFN transmission based on the SRS measurements performed by the neighbor cell 410.

In the example of FIG. 4, the neighbor cell 410-b may determine that the measurements performed on the SRSs received on the neighbor cell beam 425 at the neighbor cell 410-b satisfy one or more thresholds (e.g., the received power, received quality, or SINR is above a threshold. Thus, the neighbor cell 410 may determine to join the SFN cell group for the SFN transmission. In addition, the neighbor cell 410-a may determine that the measurements performed on the SRSs received on the neighbor cell beam 425 at the neighbor cell 410-b fail to satisfy one or more thresholds (e.g., the received power, received quality, or SINR is below a threshold). Thus, the neighbor cell 410-a may determine to not join the SFN cell group for the SFN transmission.

The serving cell 405 and the neighbor cell 410-b may then transmit the SFN data in the SFN transmission synchronously (e.g., at the same time). That is, the serving cell 405 and the neighbor cells 410 that decide to join the SFN cell group may transmit the SFN data at the same time. The serving cell 405 may use the serving cell beam 420 selected in the beam selection procedure at 400-a for the SFN transmission (e.g., quasi co-located with SSB 0 at PCI 0), and the neighbor cell 410-b may use the neighbor cell beam 425 selected as the best beam based on the SRS measurements at 400-b for the SFN transmission (e.g., quasi co-located with SSB 1 at PCI 2). Further, the neighbor cell 410-a may avoid transmitting on the neighbor cell beam 425 selected as the best beam based on the SRS measurements at 400-b for the SFN transmission (e.g., quasi co-located with SSB 2 at PCI 1). The serving cell 405 may transmit DCI to the UE 115-c including a TCI associated with the SSB of the serving cell beam 420. For instance, the TCI may include quasi co-location information in a TCI state that corresponds to an SSB index of SSB 0 (i.e., the receive beam associated with SSB 0 of PCI 0). Thus, the UE 115-c may use the UE beam 415 corresponding to the serving cell beam 420 (e.g., a receive beam corresponding to the SSB of the serving cell 405 indicated by the TCI) to receive the SFN transmission from the serving cell 405 and the neighbor cell 410-b.

Figure 5A:
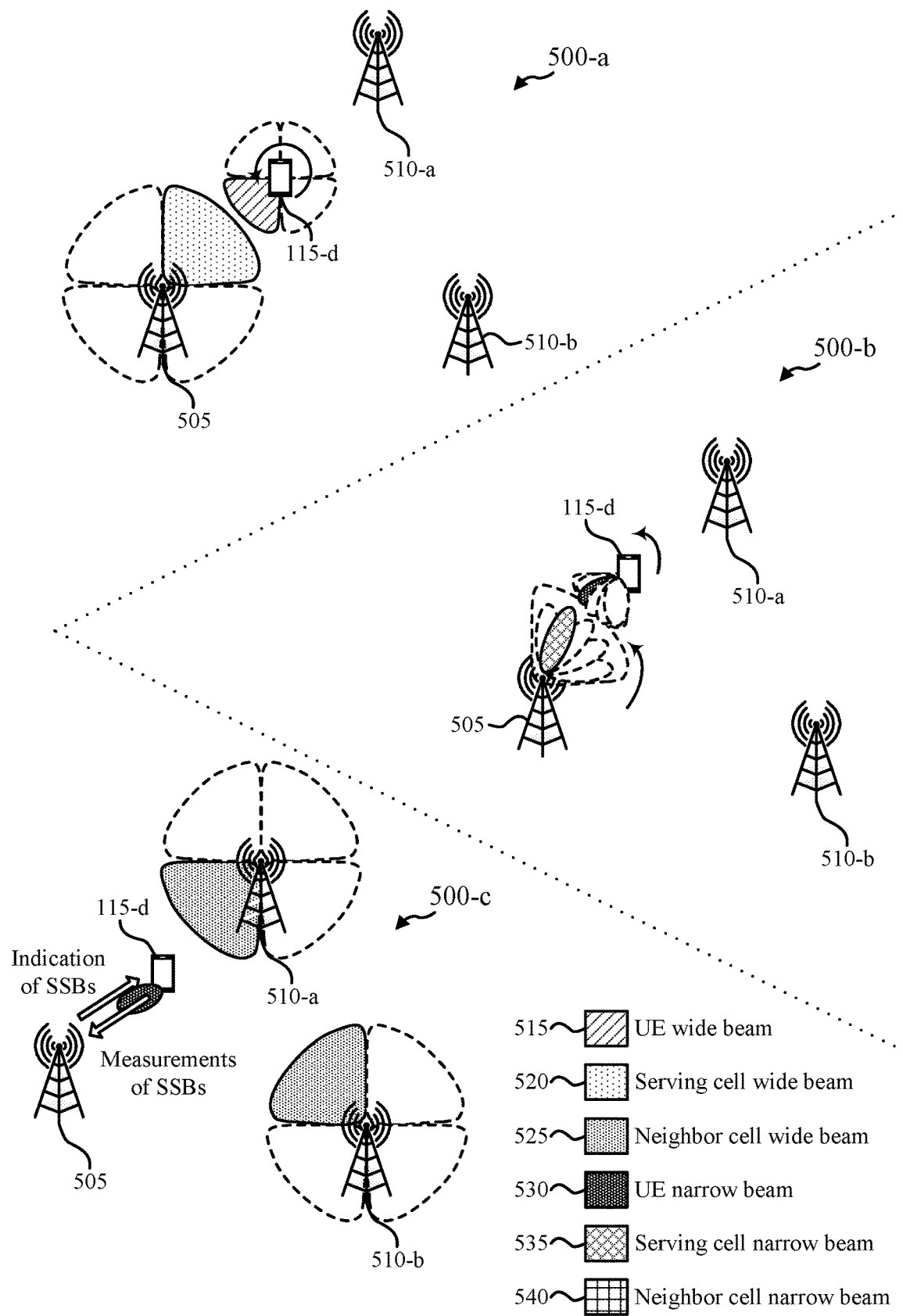
FIGS. 5A and 5B illustrate examples of communications between a serving cell, a first neighbor cell, a second neighbor cell, and a UE as part of an SFN transmission procedure based on SRSs in accordance with aspects of the present disclosure.
Figure 5B:
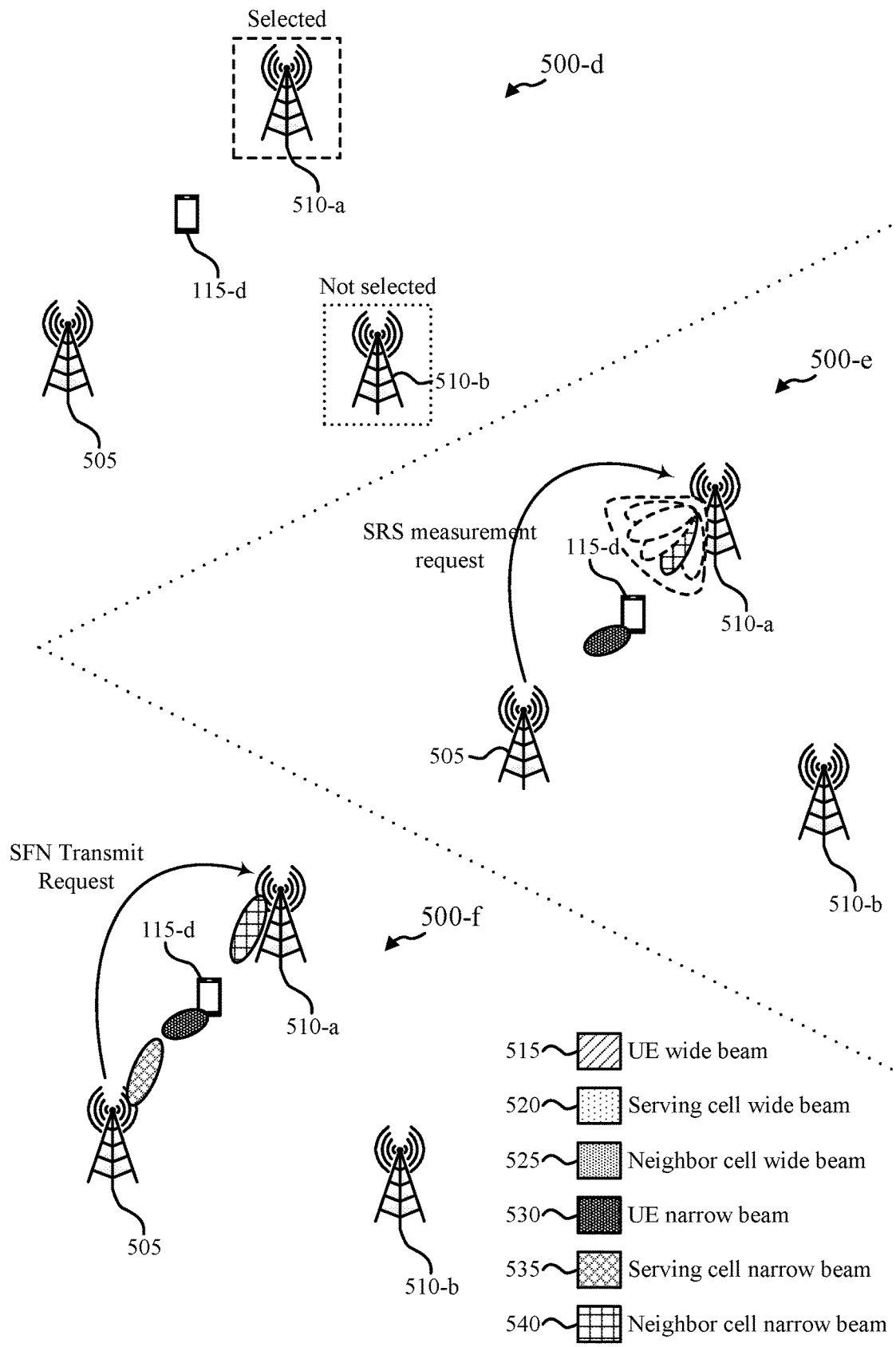

FIGS. 5A and 5B illustrate examples of communications between a serving cell 505 (e.g., PCI 0), a neighbor cell 510-a (e.g., PCI 1), a neighbor cell 510-b (e.g., PCI 2), and a UE 115-d as part of an SFN transmission procedure based on SRSs in accordance with aspects of the present disclosure. At 500-a in FIG. 5A, the UE 115-d may perform an initial access procedure to gain access to the serving cell 505 and a beam selection procedure to select a wide beam for communications with the serving cell 505. As part of the beam selection procedure, the UE 115-d may monitor for SSBs from the serving cell 505 and may select a wide beam for communicating with the serving cell 505 based on the SSBs. For instance, the serving cell 505 may transmit four SSBs on four wide beams (e.g., transmit beams) at the serving cell 505 (i.e., the serving cell 505 may perform beam sweeping when transmitting the SSBs), and the UE 115-d may receive each of the four SSBs on four wide beams (e.g., receive beams) at the UE 115-d (i.e., the UE 115-d may perform beam sweeping when receiving the SSBs).

The UE 115-d may then perform measurements on the SSBs, and the UE 115-d may determine that the SSB transmitted on a serving cell wide beam 520 (e.g., transmit beam) and received on the UE wide beam 515 (e.g., receive beam) is associated with the best measurements. In particular, the UE 115-d may determine that measurements (e.g., received power, received quality, or SINR) performed on the SSB transmitted on the serving cell wide beam 520 and received on the UE wide beam 515 is higher than the same measurements performed on SSBs (e.g., all SSBs) received on other beams at the UE 115-d and higher than the same measurements performed on other SSBs received on the UE wide beam 515. Thus, the UE 115-d may select the UE wide beam 515 for communicating with the serving cell 505, and the serving cell 505 may select the serving cell wide beam 520 for communicating with the UE 115-d (e.g., based on the UE 115-*d* indicating the index of the SSB transmitted on the serving cell wide beam 520 to the serving cell 505). That is, a best wide transmit beam at the serving cell 505 and a best wide receive beam at the UE 115-*d* may be determined via SSB beam sweeping in the serving cell 505 (e.g., normal P1 operation).

At 500-*b* in FIG. 5A, the UE 115-*d* may perform a transmit and receive beam refinement procedure via channel state information reference signals (e.g., P2 or P3 operation) to select a narrow beam for communications with the serving cell 505. As part of the beam refinement procedure, the UE 115-*d* may monitor for channel state information reference signals (CSI-RSs) from the serving cell 505 and may select a narrow beam for communicating with the serving cell 505 based on the CSI-RSs. For instance, the serving cell 505 may transmit multiple CSI-RSs on multiple narrow beams associated with the serving cell wide beam 520 selected in the beam selection procedure described at 500-*a*, and the UE 115-*d* may receive the CSI-RSs on multiple narrow beams at the UE 115-*e* associated with the UE wide beam 515 selected in the beam selection procedure described at 500-*a* (i.e., the UE 115-*d* may perform beam sweeping when receiving the CSI-RSs).

The UE 115-*d* may then perform measurements on the CSI-RSs, and the UE 115-*d* may determine that the CSI-RSs transmitted on a serving cell narrow beam 535 (e.g., a transmit beam) and received on the UE narrow beam 530 (e.g., a receive beam) is associated with the best measurements. In particular, the UE 115-*d* may determine that measurements (e.g., received power, received quality, or SINR) performed on the CSI-RSs transmitted on the serving cell narrow beam 535 and received on the UE narrow beam 530 is higher than the same measurements performed on CSI-RSs received on other narrow beams at the UE 115-*d* and higher than the same measurements performed on CSI-RSs transmitted by other transmit beam and received on the UE narrow beam 530. Thus, the UE 115-*d* may select the UE narrow beam 530 for communicating with the serving cell 505, and the serving cell 505 may select the serving cell narrow beam 535 for communicating with the UE 115-*d* (e.g., based on the UE 115-*d* indicating the serving cell narrow beam 535 to the serving cell 505). That is, a best narrow transmit beam at the serving cell 505 and a best narrow receive beam at the UE 115-*d* may be determined via CSI-RS beam sweeping in the serving cell 505 (e.g., normal P2 or P3 operation).

At 500-*c* in FIG. 5A, the serving cell 505 may then configure the UE 115-*d* to perform measurements on SSBs transmitted from the neighbor cells 510 to determine which neighbor cells 510 to include in an SFN group for an SFN transmission to the UE 115-*d*. That is, the UE-specific SFN cell group selection may be based on SSBs, where the UE 115-*d* may report the measurements performed on SSBs transmitted by the neighbor cells 510 to the serving cell 505, and the serving cell 505 may decide the UE-specific SFN cell group based on the reported measurements. The serving cell 505 may inform the UE 115-*d* of the SSB information of the neighbor cells 510. The SSB information for a neighbor cell 510 may include the PCI of the neighbor cell 510, a set of time-frequency resources used by the neighbor cell 510 to transmit the SSBs (SSB location), a periodicity with which the neighbor cell 510 transmits the SSBs, etc.

Further, the serving cell 505 may request that the UE 115-*d* report the measurements of the SSBs of the neighbor cells 510. For instance, the serving cell 505 may configure the UE 115-*d* to report an index of the SSB with the strongest measurements for each neighbor cell 510, a layer 1 reference signal received power (L1-RSRP) of the SSB with the strongest measurements for each neighbor cell 510, etc.). In addition, the measurements of the SSBs may be based on receiving the SSBs from the neighbor cells 510 on the UE narrow beam 530 selected in the beam refinement procedure at 500-*b*. If the UE receive beam is fixed (e.g., remained as the best receive beam associated with CSI-RSs of the serving cell 505) during the SSB measurement process, a current SSB L1-RSRP report mechanism may be used. The UE 115-*d* may then perform measurements on the SSBs received from the neighbor cells 510, and the UE 115-*d* may determine that the SSB transmitted on the neighbor cell wide beam 525 at neighbor cell 510-*a* (as shown) is associated with the best measurements and the SSB transmitted on the neighbor cell wide beam 525 at neighbor cell 510-*b* (as shown) is associated with the best measurements. In some cases, the UE 115-*d* may report the measurements of the SSBs received from each neighbor cell 510 in a list of neighbor cells 510 at serving cell 505, and the process may be repeated over all the neighbor cells in the neighbor cells list.

In the examples of FIG. 5A and FIG. 5B, the UE 115-*d* may determine that measurements (e.g., received power, received quality, or SINR) performed on the SSB transmitted on the neighbor cell wide beam 525 at neighbor cell 510-*a* (as shown) and received on the UE narrow beam 530 is higher than the same measurements performed on SSBs received on other beams at the UE 115-*d* and higher than the same measurements performed on other SSBs received from the neighbor cell 510-*a* on the UE narrow beam 530. Similarly, the UE 115-*d* may determine that measurements performed on the SSB transmitted on the neighbor cell wide beam 525 at neighbor cell 510-*b* (as shown) and received on the UE narrow beam 530 is higher than the same measurements performed on SSBs received on other beams at the UE 115-*d* and higher than the same measurements performed on other SSBs received from the neighbor cell 510-*b* on the UE narrow beam 530. Thus, the UE 115-*d* may report, to the serving cell 505, the measurements performed on the SSB transmitted on the neighbor cell wide beam 525 at neighbor cell 510-*a* (as shown) and the measurements performed on the SSB transmitted on the neighbor cell wide beam 525 at neighbor cell 510-*a* (as shown).

At 500-*d* in FIG. 5B, the serving cell 505 may select the neighbor cells 510 to be included in an SFN cell group for an SFN transmission to the UE 115-*d* based on the SSB measurements reported from the UE 115-*d* to the serving cell 505. That is, the serving cell 505 may select the neighbor cells 510 for SFN transmission to the UE 115-*d* based on the report transmitted to the serving cell 505 of the measurements performed by the UE 115-*d* on the SSBs transmitted by the neighbor cells 510. In the example of FIG. 5, the serving cell 505 may determine that the measurements reported by the UE 115-*d* for the neighbor cell 510-*a* satisfy one or more thresholds (e.g., the reported received power, received quality, or SINR is above a threshold). Thus, the serving cell 505 may add the neighbor cell 510-*a* to the SFN cell group for the SFN transmission to the UE 115-*d*. In addition, the serving cell 505 may determine that the measurements reported by the UE 115-*d* for the neighbor cell 510-*b* fail to satisfy one or more thresholds (e.g., the reported received power, received quality, or SINR is below a threshold). Thus, the serving cell 505 may exclude the neighbor cell 510-*b* from the SFN cell group for the SFN transmission to the UE 115-*d*.

At 500-*e*, the serving cell 505 may transmit a request to the UE 115-*d* for the UE 115-*d* to transmit SRSs. For instance, the serving cell 505 may transmit an SRS configuration message to the UE 115-*d* requesting that the UE 115-*d* sends SRSs. The SRS configuration message may include spatial relation information with an index of the CSI-RSs transmitted on the serving cell narrow beam 535 associated with the best measurements in the beam refinement procedure (e.g., to indicate that the UE 115-*d* is to use the UE narrow beam 530 to transmit the SRSs). Thus, the UE 115-*d* may use the UE narrow beam 530 to transmit the SRSs. That is, the beam used to transmit the SRSs (e.g., SRS transmit beam) may be the same as the receive beam associated with the CSI-RS 1 of PCI 0.

The serving cell 505 may then transmit an SRS measurement request to the neighbor cell 510-*a* (e.g., neighbor cell 510-*a*, but not neighbor cell 510-*b* because the neighbor cell 510-*b* was not selected to be in the SFN cell group) requesting that the neighbor cell 510-*a* perform measurements on SRSs received from the UE 115-*d*. The SRS measurement request may be transmitted to the neighbor cell 510-*a* based on adding the neighbor cell 510-*a* to the SFN cell group for the SFN transmission at 500-*d* in FIG. 5B. The UE 115-*d* may transmit the same SRS repeatedly over time (e.g., during multiple slots or OFDM symbols) to allow one or more neighbor cells 510 to select the best receive beam with receive beam sweeping. In some cases, the serving cell 505 may also send (e.g., in the SRS measurement request) information about the SRSs to be transmitted by the UE 115-*d*. The information about the SRSs may include the set of time-frequency resources to be used to transmit the SRSs (SRS location), the periodicity with which the SRSs are to be transmitted (SRS period), the number of SRS transmissions (SRS repetition number), etc. The SRS measurement request transmitted to a neighbor cell 510 may also include an indication of an index of the best SSB transmitted by the neighbor cell 510 (e.g., SSB 2) and selected by the UE 115-*d* at 500-*c* (e.g., the SSB associated with the neighbor cell wide beam 525).

Thus, the neighbor cell 510-*a* (e.g., neighbor cell 510-*a* but not the neighbor cell 510-*b*) may receive the SRSs on multiple beams (e.g., narrow beams each associated with a CSI-RS or group of CSI-RSs) and may perform measurements on the SRSs received on each of the multiple beams. That is, the neighbor cell 510-*a* may measure the SRSs by sweeping receive beams associated with CSI-RSs. The beams (e.g., transmit or receive) associated with the CSI-RSs used by the neighbor cell 510-*a* to receive the SRSs may be quasi co-located with the SSB (e.g., SSB 2) associated with the neighbor cell wide beam 525. The neighbor cell 510-*a* may then determine that the SRSs received on a neighbor cell narrow beam 540 at the neighbor cell 510-*a* (e.g., a receive beam) is associated with the best measurements. In particular, the neighbor cell 510-*a* may determine that measurements (e.g., received power, received quality, or SINR) performed on the SRSs received on the neighbor cell narrow beam 540 is higher than the same measurements performed on SRSs received on other beams at the neighbor cell 510-*a*. Thus, the neighbor cell 510-*a* may select the neighbor cell narrow beam 540 for communicating with the UE 115-*d* (e.g., transmitting data to the UE 115-*d* in an SFN transmission).

At 500-*f*, the serving cell 505 may transmit an SFN transmit request to the neighbor cell 510-*a* for the SFN transmission (e.g., to transmit SFN data using the beam associated with CSI-RS 3) based on adding the neighbor cell 510-*a* to the SFN cell group for the SFN transmission at 500-*d* in FIG. 5B. That is, the serving cell 505 may request for each neighbor cell 510 in the SFN cell group to transmit SFN data in the SFN transmission using a best beam selected by the neighbor cell 510 based on the SRS measurements at 500-*e*. The serving cell 505 and the neighbor cell 510-*a* may then transmit the SFN data in the SFN transmission synchronously (e.g., at the same time). The serving cell 505 may use the serving cell narrow beam 535 selected in the beam refinement procedure at 500-*b* in FIG. 5A for the SFN transmission (e.g., quasi co-located with CSI-RS 1 at PCI 0), and the neighbor cell 510-*a* may use the neighbor cell narrow beam 540 selected as the best beam based on the SRS measurements at 500-*e* for the SFN transmission (e.g., quasi co-located with CSI-RS 3 at PCI 1). The serving cell 505 may transmit DCI to the UE 115-*d* including a TCI associated with the CSI-RS of the serving cell narrow beam 535. For instance, the TCI may include quasi co-location information in a TCI state that corresponds to a CSI-RS index of CSI-RS 1 (i.e., the receive beam associated with CSI-RS 1 of PCI 0). Thus, the UE 115-*b* may use the UE narrow beam 530 corresponding to the serving cell narrow beam 535 (e.g., a receive beam corresponding to the CSI-RS of the serving cell 505 indicated by the TCI) to receive the SFN transmission from the serving cell 505 and the neighbor cell 510-*a*.

Figure 6:
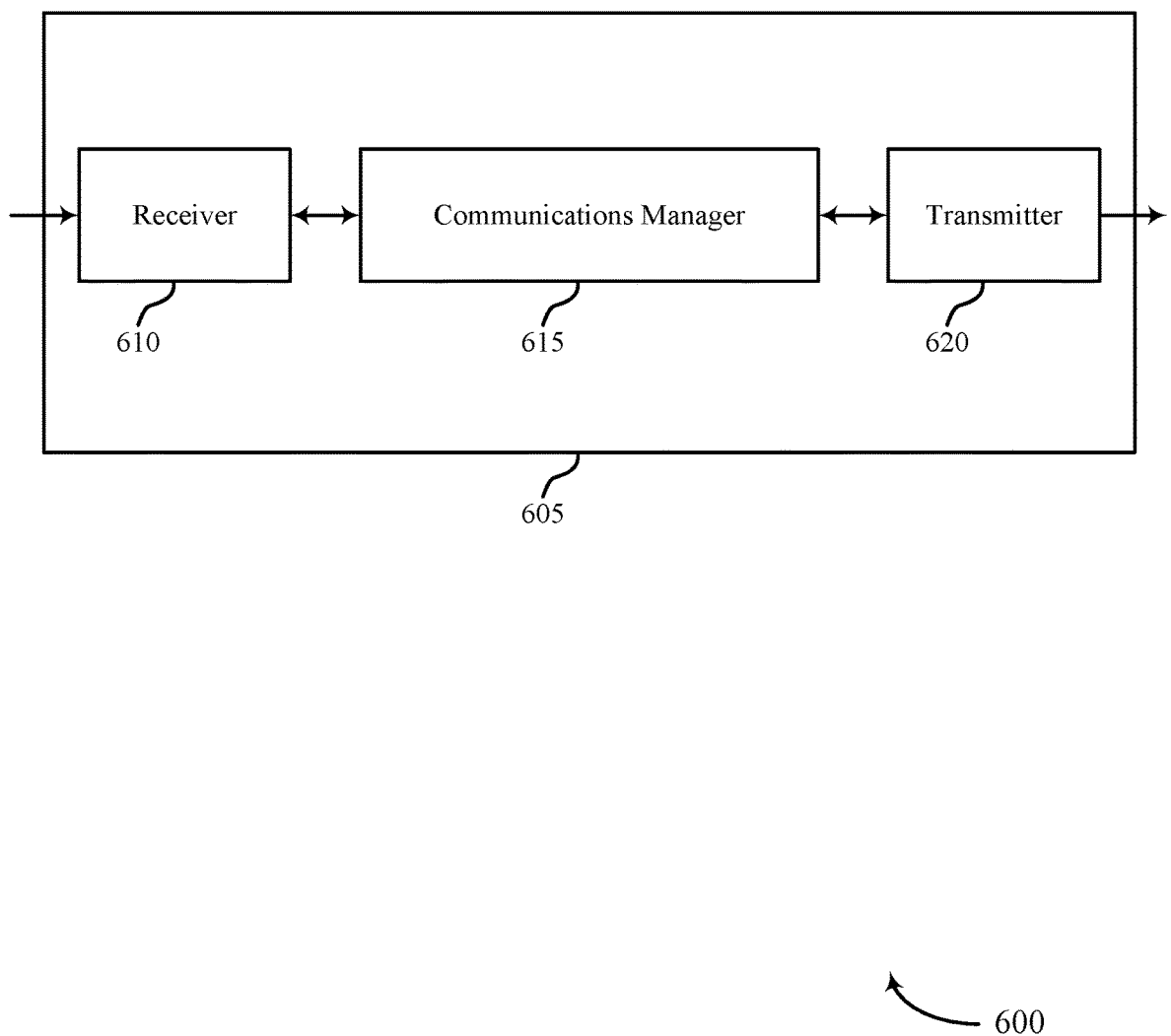
FIGS. 6 and 7 show block diagrams of devices that support SFN transmission procedure based on SRSs in accordance with aspects of the present disclosure.

FIG. 6 shows a block diagram 600 of a device 605 that supports SFN transmission procedure based on SRSs in accordance with aspects of the present disclosure. The device 605 may be an example of aspects of a base station 105, a serving cell 205, a first neighbor cell 210-*a*, a second neighbor cell 210-*b*, a serving cell 305, a neighbor cell 310-*a*, a neighbor cell 310-*b*, a serving cell 405, a neighbor cell 410-*a*, a neighbor cell 410-*b*, a serving cell 505, a neighbor cell 510-*a*, or a neighbor cell 410-*b* as described herein. In some examples, the device 605 may be an example of aspects of a first cell, where the first cell is an example of a serving cell 205, a serving cell 305, a serving cell 405, or a serving cell 505 as described herein. In some examples, the device 605 may be an example of aspects of a second cell, where the second cell is an example of a first neighbor cell 210-*a*, a second neighbor cell 210-*b*, a neighbor cell 310-*a*, a neighbor cell 310-*b*, a neighbor cell 410-*a*, a neighbor cell 410-*b*, a neighbor cell 510-*a*, or a neighbor cell 510-*b* as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to SFN transmission procedure based on SRSs, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit a control message to a UE indicating that the UE is to transmit sounding reference signals, transmit, based on transmitting the control message, a measurement request to one or more second cells capable of transmitting a single frequency network transmission to the UE with the first cell, the measurement request indicating for the one or more second cells to perform measurements on the sounding reference signals, and transmit the single frequency network transmission to the UE based on transmitting the measurement request. The communications manager 615 may also receive, from a first cell capable of transmitting a single frequency network transmission to a UE with the second cell, a measurement request indicating that the second cell is to perform measurements on sounding reference signals received from the UE, receive the sounding reference signals from the UE based on the received measurement request, perform the measurements on the sounding reference signals received from the UE, and transmit the single frequency network transmission to the UE based on the measurements. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to provide assistance for identifying a suitable transmit beam for SFN transmissions between a UE and one or more base stations. Based on the techniques for identifying a suitable transmit beam between the UE and the one or more base stations, the device 605 may support improved SFN communications.

As such, the device 605 may increase the likelihood of accurately identifying transmit beams for SFN communication between a UE and one or more base stations and accurately identify base stations to include in a SFN group and, accordingly, the SFN may communicate with a greater likelihood of successful communications.

Figure 7:
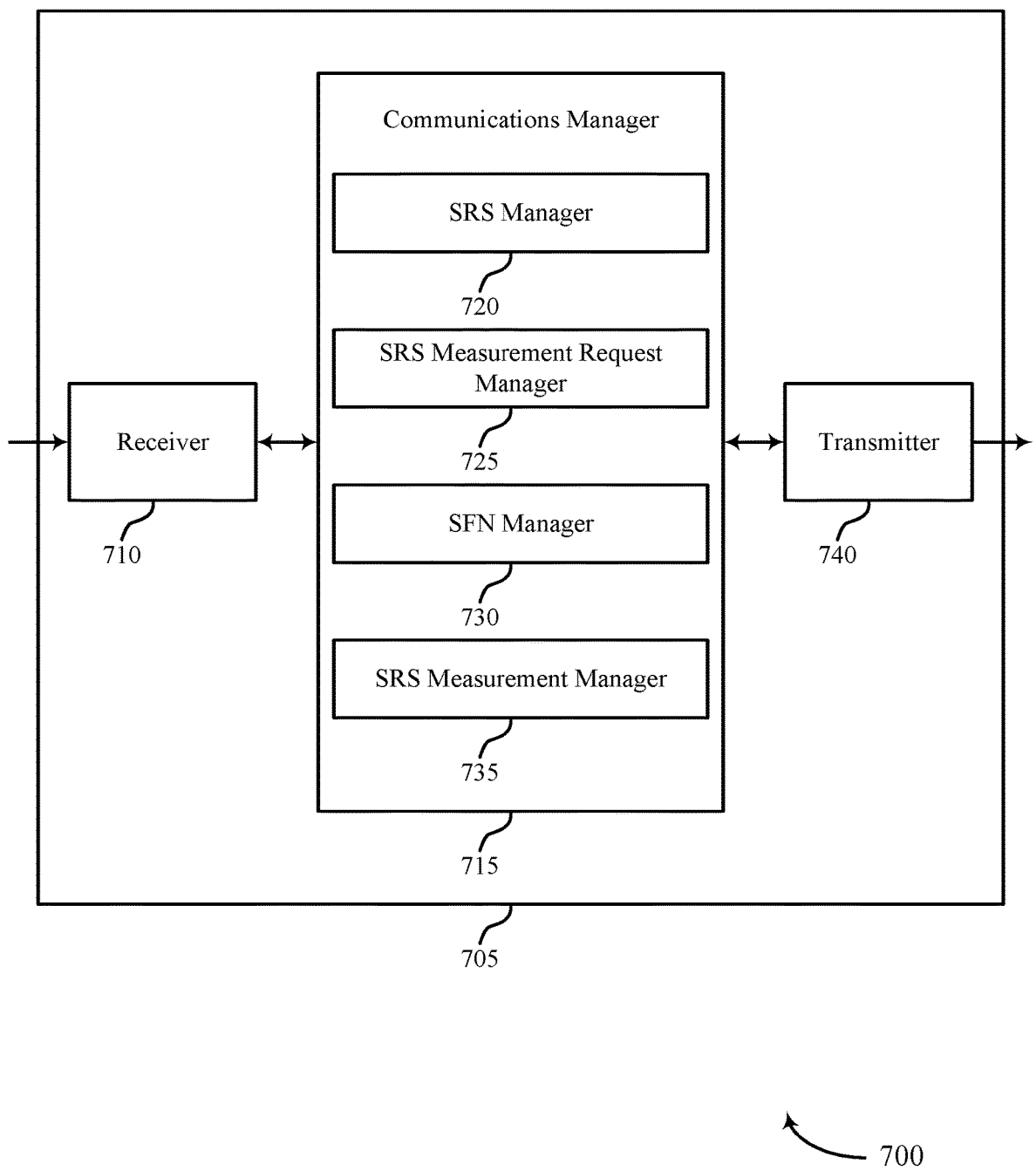

FIG. 7 shows a block diagram 700 of a device 705 that supports SFN transmission procedure based on SRSs in accordance with aspects of the present disclosure. The device 705 may be an example of aspects of a device 605, a base station 105, a serving cell 205, a first neighbor cell 210-a, a second neighbor cell 210-b, a serving cell 305, a neighbor cell 310-a, a neighbor cell 310-b, a serving cell 405, a neighbor cell 410-a, a neighbor cell 410-b, a serving cell 505, a neighbor cell 510-a, or a neighbor cell 410-b as described herein. In some examples, the device 705 may be an example of aspects of a first cell, where the first cell is an example of a serving cell 205, a serving cell 305, a serving cell 405, or a serving cell 505 as described herein. In some examples, the device 705 may be an example of aspects of a second cell, where the second cell is an example of a first neighbor cell 210-a, a second neighbor cell 210-b, a neighbor cell 310-a, a neighbor cell 310-b, a neighbor cell 410-a, a neighbor cell 410-b, a neighbor cell 510-a, or a neighbor cell 510-b as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to SFN transmission procedure based on SRSs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an SRS manager 720, an SRS measurement request manager 725, an SFN manager 730, and an SRS measurement manager 735. The communications manager 715 may be an example of aspects of the communications manager 910 described herein.

The SRS manager 720 may transmit a control message to a UE indicating that the UE is to transmit sounding reference signals. The SRS measurement request manager 725 may transmit, based on transmitting the control message, a measurement request to one or more second cells capable of transmitting a single frequency network transmission to the UE with the first cell, the measurement request indicating for the one or more second cells to perform measurements on the sounding reference signals. The SFN manager 730 may transmit the single frequency network transmission to the UE based on transmitting the measurement request.

The SRS measurement request manager 725 may receive, from a first cell capable of transmitting a single frequency network transmission to a UE with the second cell, a measurement request indicating that the second cell is to perform measurements on sounding reference signals received from the UE. The SRS manager 720 may receive the sounding reference signals from the UE based on the received measurement request. The SRS measurement manager 735 may perform the measurements on the sounding reference signals received from the UE. The SFN manager 730 may transmit the single frequency network transmission to the UE based on the measurements.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
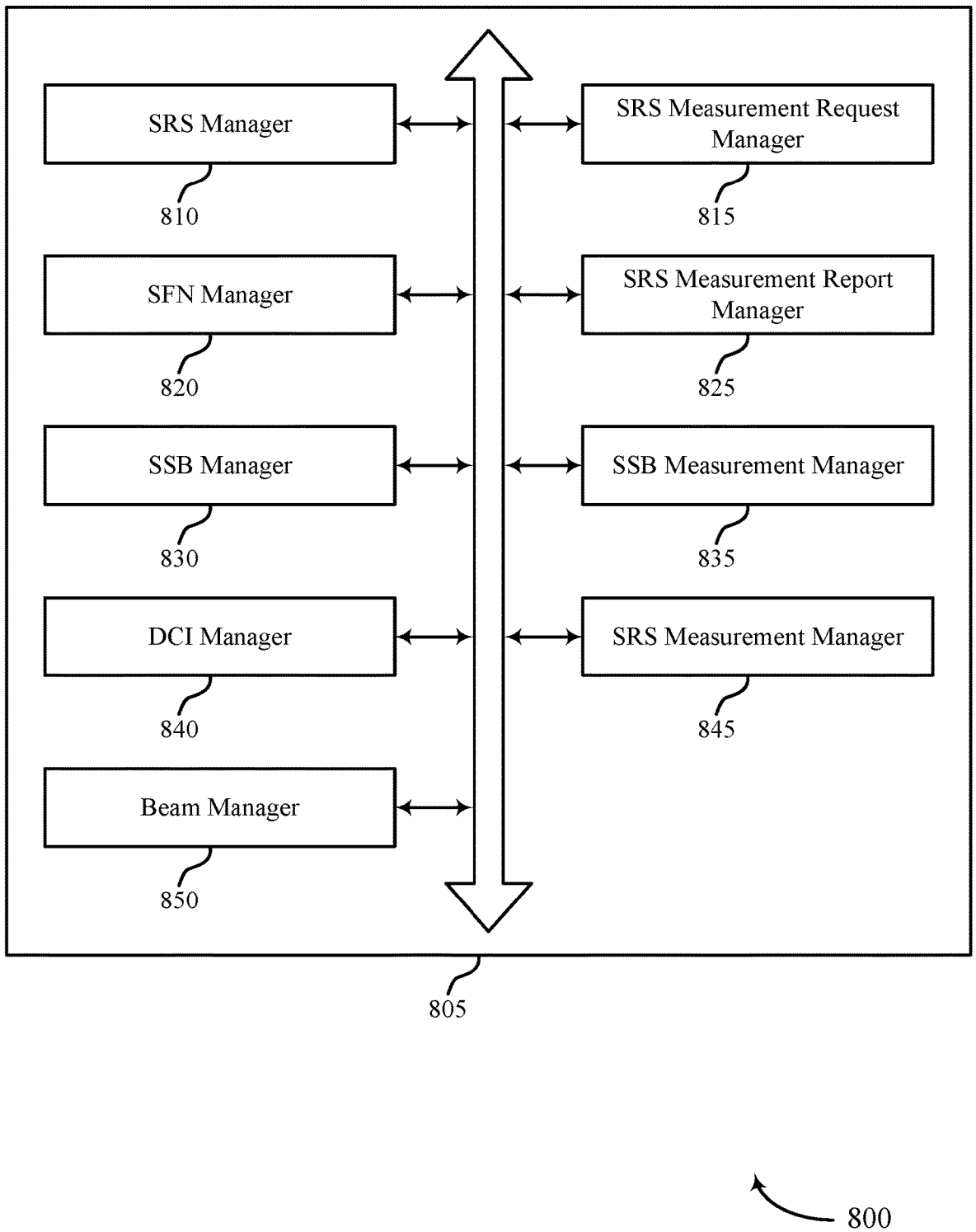
FIG. 8 shows a block diagram of a communications manager that supports SFN transmission procedure based on SRSs in accordance with aspects of the present disclosure.

FIG. 8 shows a block diagram 800 of a communications manager 805 that supports SFN transmission procedure based on SRSs in accordance with aspects of the present disclosure. The communications manager 805 may be an example of aspects of a communications manager 615, a communications manager 715, or a communications manager 910 described herein. The communications manager 805 may include an SRS manager 810, an SRS measurement request manager 815, an SFN manager 820, an SRS measurement report manager 825, an SSB manager 830, an SSB measurement manager 835, a DCI manager 840, an SRS measurement manager 845, and a beam manager 850. Each of these modules may communicate, directly or indirectly, with one another (e.g., via one or more buses).

The SRS manager 810 may transmit a control message to a UE indicating that the UE is to transmit sounding reference signals. In some examples, the SRS manager 810 may receive the sounding reference signals from the UE based on the received measurement request. In some examples, the SRS manager 810 may receive the sounding reference signals on a first set of beams associated with a set of synchronization signal blocks. In some examples, the SRS manager 810 may receive the sounding reference signals on a first set of beams, each beam of the first set of beams associated with a synchronization signal block. In some examples, the SRS manager 810 may receive the sounding reference signals on a second set of beams, each beam of the second set of beams associated with a channel state information reference signal, and the second set of beams being associated with the synchronization signal block.

The SRS measurement request manager 815 may transmit, based on transmitting the control message, a measurement request to one or more second cells capable of transmitting a single frequency network transmission to the UE with the first cell, the measurement request indicating for the one or more second cells to perform measurements on the sounding reference signals. In some examples, the SRS measurement request manager 815 may receive, from a first cell capable of transmitting a single frequency network transmission to a UE with the second cell, a measurement request indicating that the second cell is to perform measurements on sounding reference signals received from the UE.

In some examples, the SRS measurement request manager 815 may transmit, in the measurement request to the second cell, an index of a synchronization signal block selected by the UE based on the measurements performed by the UE on the one or more synchronization signal blocks transmitted by the second cell. In some cases, the measurement request includes a set of time-frequency resources used to transmit the sounding reference signals, a period of the sounding reference signals, a repetition number of the sounding reference signals, or a combination thereof. In some cases, the measurement request includes a set of time-frequency resources used to transmit the sounding reference signals, a period of the sounding reference signals, a repetition number of the sounding reference signals, or a combination thereof.

The SFN manager 820 may transmit the single frequency network transmission to the UE based on transmitting the measurement request. In some examples, the SFN manager 820 may transmit the single frequency network transmission to the UE based on the measurements. In some examples, the SFN manager 820 may add the second cell to a single frequency network cell group for the single frequency network transmission based on the measurement report. In some examples, the SFN manager 820 may transmit, to the second cell, a request for the second cell to transmit the single frequency network transmission to the UE with the first cell. In some examples, the SFN manager 820 may transmit the single frequency network transmission to the UE with the second cell.

In some examples, the SFN manager 820 may exclude the second cell from a single frequency network cell group for the single frequency network transmission based on the measurement report. In some examples, the SFN manager 820 may transmit, to the one or more second cells, a request for the one or more second cells to transmit the single frequency network transmission to the UE with the first cell. In some examples, the SFN manager 820 may add the second cell to a single frequency network cell group for the single frequency network transmission based on the measurements performed by the UE on the one or more synchronization signal blocks transmitted by the second cell. In some examples, the SFN manager 820 may exclude the second cell from a single frequency network cell group for the single frequency network transmission based on the measurements performed by the UE on the one or more synchronization signal blocks transmitted by the second cell.

In some examples, the SFN manager 820 may receive, from the first cell, a request for the second cell to transmit the single frequency network transmission to the UE with the first cell based on the measurement report. In some examples, the SFN manager 820 may transmit the single frequency network transmission to the UE with the first cell based on receiving the request. In some examples, the SFN manager 820 may receive, from the first cell, a request for the second cell to transmit the single frequency network transmission to the UE with the first cell. In some examples, the SFN manager 820 may transmit the single frequency network transmission to the UE with the first cell based on the measurements performed by the second cell on the sounding reference signals. In some examples, the SFN manager 820 may receive, from the first cell, a request for the second cell to transmit the single frequency network transmission to the UE with the first cell based on receiving the index of the synchronization signal block. In some examples, the SFN manager 820 may transmit the single frequency network transmission to the UE with the first cell on the selected beam.

The SRS measurement manager 845 may perform the measurements on the sounding reference signals received from the UE. In some examples, the SRS measurement manager 845 may perform the measurements on the sounding reference signals received on the first set of beams. In some examples, the SRS measurement manager 845 may perform the measurements on the sounding reference signals received on the second set of beams. The SRS measurement report manager 825 may receive, from a second cell of the one or more second cells, a measurement report indicating a result of the measurements performed by the second cell on the sounding reference signals. In some examples, the SRS measurement report manager 825 may transmit, to the first cell, a measurement report indicating a result of the measurements performed by the second cell on the sounding reference signals. In some cases, the measurement report includes an index of a synchronization signal block corresponding to a first beam selected from the first set of beams based on the measurements performed by the second cell on the sounding reference signals, an indication of a received power of the sounding reference signals on the first beam, or a combination thereof.

The SSB manager 830 may transmit, to the UE, an indication of one or more synchronization signal blocks to be transmitted by a second cell of the one or more second cells. In some examples, the SSB manager 830 may transmit one or more synchronization signal blocks. In some examples, the SSB manager 830 may receive, based on transmitting the one or more synchronization signal blocks, an index of a synchronization signal block of the one or more synchronization signal blocks in the measurement request, the synchronization signal block selected by the UE based on the measurements performed by the UE on the one or more synchronization signal blocks. The SSB measurement manager 835 may receive, from the UE, a result of measurements performed by the UE on the one or more synchronization signal blocks transmitted by the second cell.

The DCI manager 840 may transmit, to the UE, downlink control information including a TCI indicating a receive beam corresponding to a synchronization signal block of the first cell for the UE to use to receive the single frequency network transmission. The beam manager 850 may select a beam of the second set of beams to use to transmit the single frequency network transmission to the UE with the first cell based on the measurements performed on the sounding reference signals received on each of the second set of beams.

Figure 9:
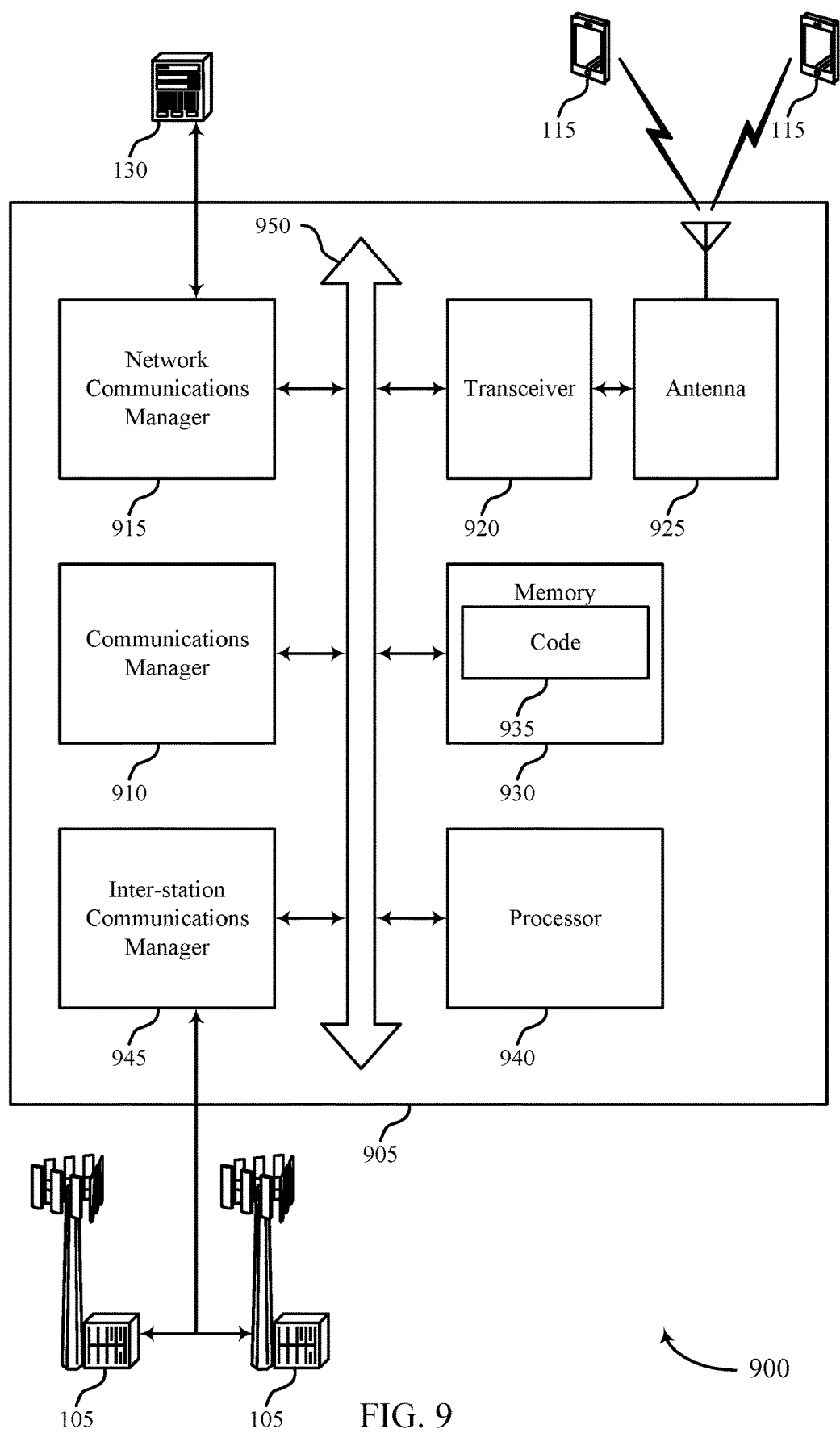
FIG. 9 shows a diagram of a system including a device that supports SFN transmission procedure based on SRSs in accordance with aspects of the present disclosure.

FIG. 9 shows a diagram of a system 900 including a device 905 that supports SFN transmission procedure based on SRSs in accordance with aspects of the present disclosure. The device 905 may be an example of or include the components of device 605, device 705, a base station 105, a serving cell 205, a first neighbor cell 210-a, a second neighbor cell 210-b, a serving cell 305, a neighbor cell 310-a, a neighbor cell 310-b, a serving cell 405, a neighbor cell 410-a, a neighbor cell 410-b, a serving cell 505, a neighbor cell 510-a, or a neighbor cell 410-b as described herein. In some examples, the device 905 may be an example of aspects of a first cell, where the first cell is an example of a serving cell 205, a serving cell 305, a serving cell 405, or a serving cell 505 as described herein. In some examples, the device 905 may be an example of aspects of a second cell, where the second cell is an example of a first neighbor cell 210-a, a second neighbor cell 210-b, a neighbor cell 310-a, a neighbor cell 310-b, a neighbor cell 410-a, a neighbor cell 410-b, a neighbor cell 510-a, or a neighbor cell 510-b as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 950).

The communications manager 910 may transmit a control message to a UE indicating that the UE is to transmit sounding reference signals, transmit, based on transmitting the control message, a measurement request to one or more second cells capable of transmitting a single frequency network transmission to the UE with the first cell, the measurement request indicating for the one or more second cells to perform measurements on the sounding reference signals, and transmit the single frequency network transmission to the UE based on transmitting the measurement request. The communications manager 910 may also receive, from a first cell capable of transmitting a single frequency network transmission to a UE with the second cell, a measurement request indicating that the second cell is to perform measurements on sounding reference signals received from the UE, receive the sounding reference signals from the UE based on the received measurement request, perform the measurements on the sounding reference signals received from the UE, and transmit the single frequency network transmission to the UE based on the measurements.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In some cases, a memory controller may be integrated into processor 940. The processor 940 may be configured to execute computer-readable instructions stored in a memory (e.g., the memory 930) to cause the device 905 to perform various functions (e.g., functions or tasks supporting SFN transmission procedure based on SRSs).

The inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
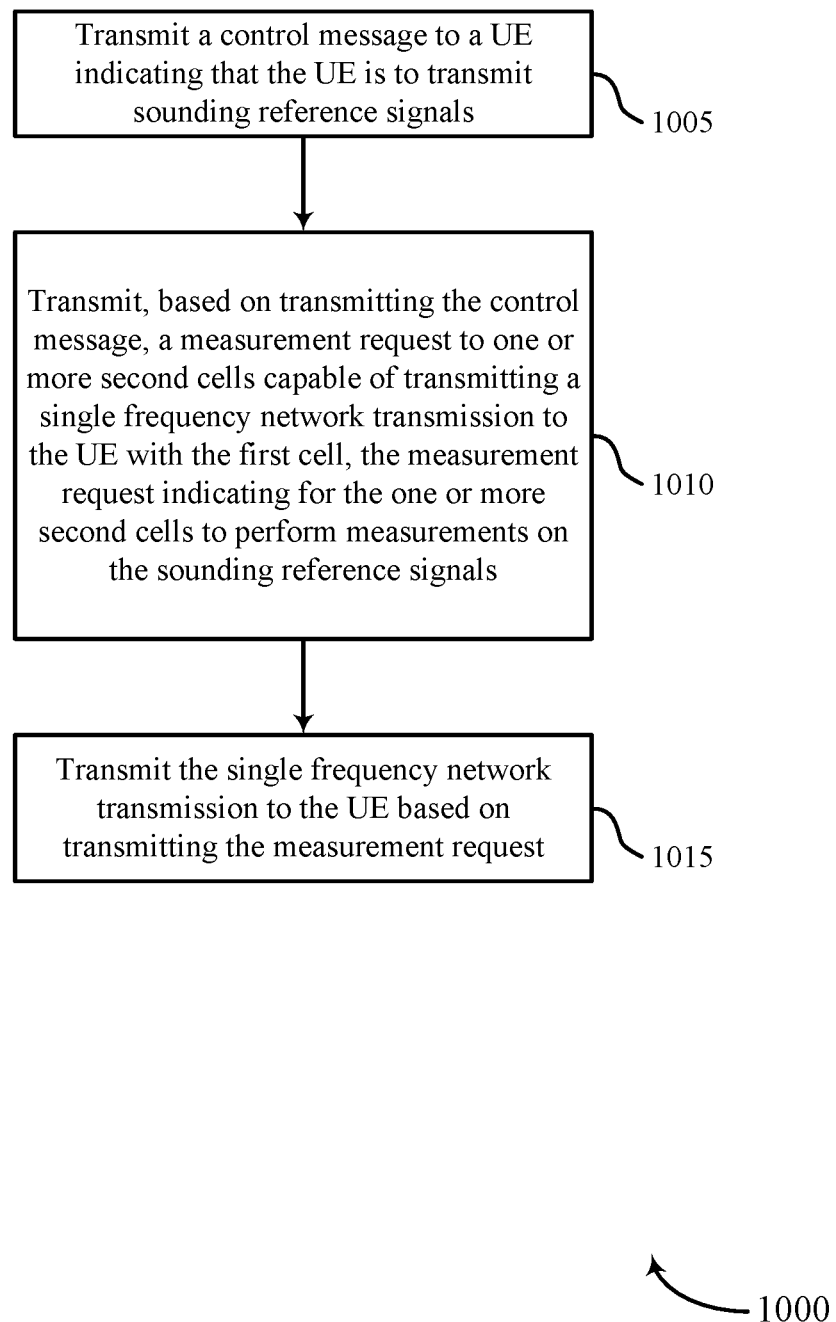
FIGS. 10 and 11 show flowcharts illustrating methods that support SFN transmission procedure based on SRSs in accordance with aspects of the present disclosure.

FIG. 10 shows a flowchart illustrating a method 1000 that supports SFN transmission procedure based on SRSs in accordance with aspects of the present disclosure. The operations of method 1000 may be implemented by a base station 105, a serving cell 205, a serving cell 305, a serving cell 405, or a serving cell 505, or its components, as described herein. In some examples, operations of method 1000 may be implemented by a first cell, where the first cell is an example of a serving cell 205, a serving cell 305, a serving cell 405, or a serving cell 505 or its components as described herein. For example, the operations of method 1000 may be performed by a communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1005, the base station may transmit a control message to a UE indicating that the UE is to transmit sounding reference signals. The operations of 1005 may be performed according to the methods described herein. In some examples, aspects of the operations of 1005 may be performed by an SRS manager as described with reference to FIGS. 6 through 9.

At 1010, the base station may transmit, based on transmitting the control message, a measurement request to one or more second cells capable of transmitting a single frequency network transmission to the UE with the first cell, the measurement request indicating for the one or more second cells to perform measurements on the sounding reference signals. The operations of 1010 may be performed according to the methods described herein. In some examples, aspects of the operations of 1010 may be performed by an SRS measurement request manager as described with reference to FIGS. 6 through 9.

At 1015, the base station may transmit the single frequency network transmission to the UE based on transmitting the measurement request. The operations of 1015 may be performed according to the methods described herein. In some examples, aspects of the operations of 1015 may be performed by an SFN manager as described with reference to FIGS. 6 through 9.

Figure 11:
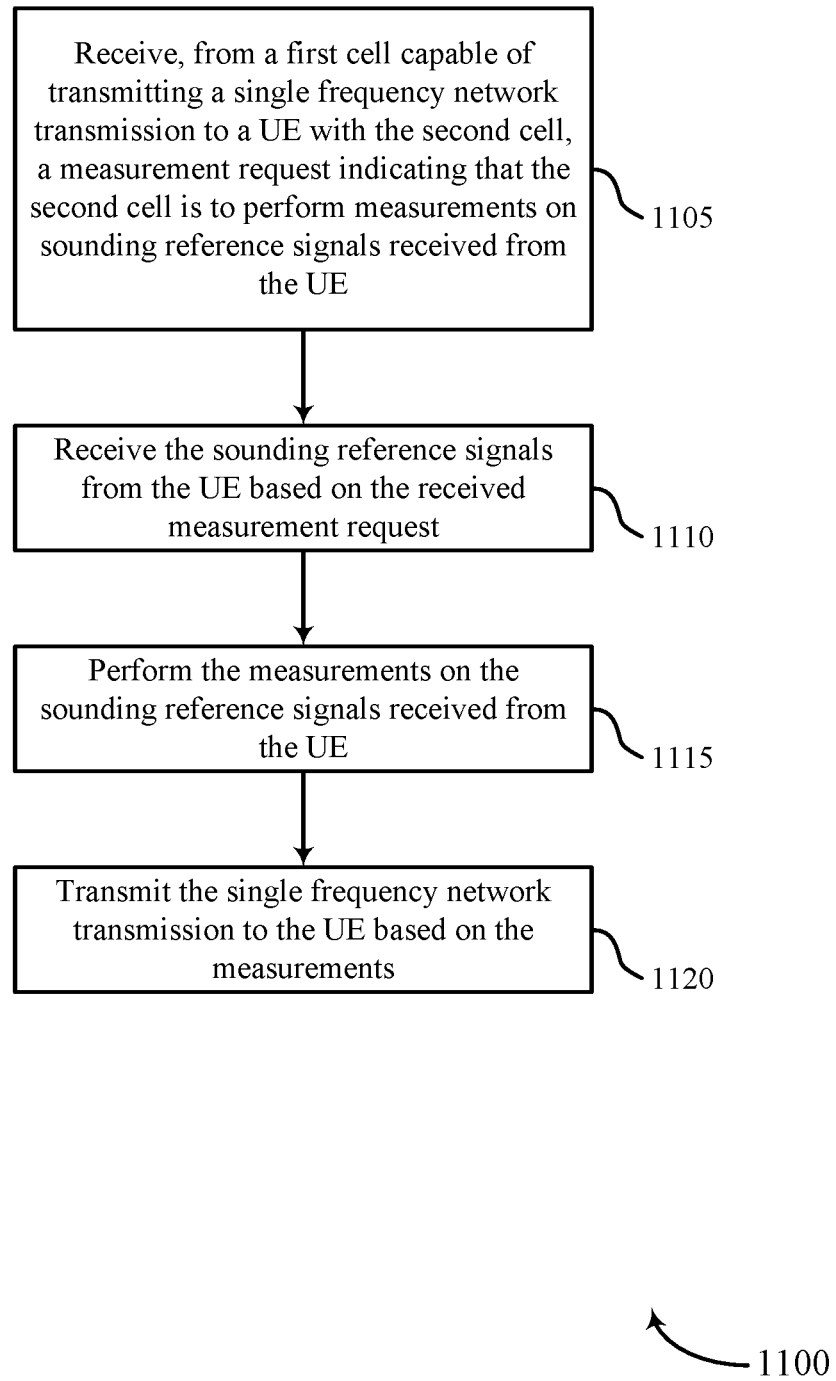

FIG. 11 shows a flowchart illustrating a method 1100 that supports SFN transmission procedure based on SRSs in accordance with aspects of the present disclosure. The operations of method 1100 may be implemented by a base station 105, a first neighbor cell 210-*a*, a second neighbor cell 210-*b*, a neighbor cell 310-*a*, a neighbor cell 310-*b*, a neighbor cell 410-*a*, a neighbor cell 410-*b*, a neighbor cell 510-*a*, or a neighbor cell 510-*b* or its components as described herein. In some examples, operations of method 1100 may be implemented by a second cell, where the second cell is an example of a first neighbor cell 210-*a*, a second neighbor cell 210-*b*, a neighbor cell 310-*a*, a neighbor cell 310-*b*, a neighbor cell 410-*a*, a neighbor cell 410-*b*, a neighbor cell 510-*a*, or a neighbor cell 510-*b* or its components as described herein. For example, the operations of method 1100 may be performed by a communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1105, the base station may receive, from a first cell capable of transmitting a single frequency network transmission to a UE with the second cell, a measurement request indicating that the second cell is to perform measurements on sounding reference signals received from the UE. The operations of 1105 may be performed according to the methods described herein. In some examples, aspects of the operations of 1105 may be performed by an SRS measurement request manager as described with reference to FIGS. 6 through 9.

At 1110, the base station may receive the sounding reference signals from the UE based on the received measurement request. The operations of 1110 may be performed according to the methods described herein. In some examples, aspects of the operations of 1110 may be performed by an SRS manager as described with reference to FIGS. 6 through 9.

At 1115, the base station may perform the measurements on the sounding reference signals received from the UE. The operations of 1115 may be performed according to the methods described herein. In some examples, aspects of the operations of 1115 may be performed by an SRS measurement manager as described with reference to FIGS. 6 through 9.

At 1120, the base station may transmit the single frequency network transmission to the UE based on the measurements. The operations of 1120 may be performed according to the methods described herein. In some examples, aspects of the operations of 1120 may be performed by an SFN manager as described with reference to FIGS. 6 through 9.

Example 1: A method for wireless communication at a first cell, comprising: transmitting a control message to a user equipment (UE) indicating that the UE is to transmit sounding reference signals; transmitting, based at least in part on transmitting the control message, a measurement request to one or more second cells capable of transmitting a single frequency network transmission to the UE with the first cell, the measurement request indicating for the one or more second cells to perform measurements on the sounding reference signals; and transmitting the single frequency network transmission to the UE based at least in part on transmitting the measurement request.

Example 2: The method of example 1 further comprising: receiving, from a second cell of the one or more second cells, a measurement report indicating a result of the measurements performed by the second cell on the sounding reference signals.

Example 3: The method of example 2 further comprising: adding the second cell to a single frequency network cell group for the single frequency network transmission based at least in part on the measurement report; transmitting, to the second cell, a request for the second cell to transmit the single frequency network transmission to the UE with the first cell; and transmitting the single frequency network transmission to the UE with the second cell.

Example 4: The method of example 2, further comprising: excluding the second cell from a single frequency network cell group for the single frequency network transmission based at least in part on the measurement report.

Example 5: The method of examples 1 through 4, further comprising: transmitting, to the one or more second cells, a request for the one or more second cells to transmit the single frequency network transmission to the UE with the first cell.

Example 6: The method of examples 1 through 2, further comprising: transmitting, to the UE, an indication of one or more synchronization signal blocks to be transmitted by a second cell of the one or more second cells; and receiving, from the UE, a result of measurements performed by the UE on the one or more synchronization signal blocks transmitted by the second cell.

Example 7: The method of example 6, further comprising: adding the second cell to a single frequency network cell group for the single frequency network transmission based at least in part on the measurements performed by the UE on the one or more synchronization signal blocks transmitted by the second cell; transmitting, to the second cell, a request for the second cell to transmit the single frequency network transmission to the UE with the first cell; and transmitting the single frequency network transmission to the UE with the second cell.

Example 8: The method of example 6, further comprising: excluding the second cell from a single frequency network cell group for the single frequency network transmission based at least in part on the measurements performed by the UE on the one or more synchronization signal blocks transmitted by the second cell.

Example 9: The method of example 6 through 8, further comprising: transmitting, in the measurement request to the second cell, an index of a synchronization signal block selected by the UE based at least in part on the measurements performed by the UE on the one or more synchronization signal blocks transmitted by the second cell.

Example 10: The method of claim 1 through 9, further comprising: transmitting, to the UE, downlink control information comprising a transmission configuration indicator (TCI) indicating a receive beam corresponding to a synchronization signal block of the first cell for the UE to use to receive the single frequency network transmission.

Example 11: The method of examples 1 through 11, wherein the measurement request comprises a set of time-frequency resources used to transmit the sounding reference signals, a period of the sounding reference signals, a repetition number of the sounding reference signals, or a combination thereof.

Example 12: The method of example 1 through 11, further comprising: selecting a subset of the one or more second cells to include in a single frequency network group for a single frequency network transmission.

Example 13: A method for wireless communication at a second cell, comprising: receiving, from a first cell capable of transmitting a single frequency network transmission to a user equipment (UE) with the second cell, a measurement request indicating that the second cell is to perform measurements on sounding reference signals received from the UE; receiving the sounding reference signals from the UE based at least in part on the received measurement request; performing the measurements on the sounding reference signals received from the UE; and transmitting the single frequency network transmission to the UE based at least in part on the measurements.

Example 14: The method of example 13, further comprising: transmitting, to the first cell, a measurement report indicating a result of the measurements performed by the second cell on the sounding reference signals.

Example 15: The method of example 14, further comprising: receiving, from the first cell, a request for the second cell to transmit the single frequency network transmission to the UE with the first cell based at least in part on the measurement report; and transmitting the single frequency network transmission to the UE with the first cell based at least in part on receiving the request.

Example 16: The method of examples 14 through 15, wherein performing the measurements on the sounding reference signals received from the UE comprises: receiving the sounding reference signals on a first set of beams associated with a plurality of synchronization signal blocks; and performing the measurements on the sounding reference signals received on the first set of beams.

Example 17: The method of example 16, wherein the measurement report comprises an index of a synchronization signal block corresponding to a first beam selected from the first set of beams based at least in part on the measurements performed by the second cell on the sounding reference signals, an indication of a received power of the sounding reference signals on the first beam, or a combination thereof.

Example 18: The method of examples 13 through 17, further comprising: receiving, from the first cell, a request for the second cell to transmit the single frequency network transmission to the UE with the first cell; and transmitting the single frequency network transmission to the UE with the first cell based at least in part on the measurements performed by the second cell on the sounding reference signals.

Example 19: The method of example 18, wherein performing the measurements on the sounding reference signals received from the UE comprises: receiving the sounding reference signals on a first set of beams, each beam of the first set of beams associated with a synchronization signal block; and performing the measurements on the sounding reference signals received on the first set of beams.

Example 20: The method of examples 13 through 19, further comprising: transmitting one or more synchronization signal blocks; receiving, based at least in part on transmitting the one or more synchronization signal blocks, an index of a synchronization signal block of the one or more synchronization signal blocks in the measurement request, the synchronization signal block selected by the UE based at least in part on the measurements performed by the UE on the one or more synchronization signal blocks; and receiving, from the first cell, a request for the second cell to transmit the single frequency network transmission to the UE with the first cell based at least in part on receiving the index of the synchronization signal block.

Example 21: The method of example 20, further comprising: receiving the sounding reference signals on a second set of beams, each beam of the second set of beams associated with a channel state information reference signal, and the second set of beams being associated with the synchronization signal block; performing the measurements on the sounding reference signals received on the second set of beams; selecting a beam of the second set of beams to use to transmit the single frequency network transmission to the UE with the first cell based at least in part on the measurements performed on the sounding reference signals received on each of the second set of beams; and transmitting the single frequency network transmission to the UE with the first cell on the selected beam.

Example 22: The method of examples 13 through 21, wherein the measurement request comprises a set of time-frequency resources used to transmit the sounding reference signals, a period of the sounding reference signals, a repetition number of the sounding reference signals, or a combination thereof.

Example 23: An apparatus for wireless communication comprising at least one means for performing a method of any one of the examples 1 through 12.

Example 24: An apparatus for wireless communication comprising a processor and memory coupled to the processor, the processor and memory configured to cause the apparatus to perform a method of any one of examples 1 through 12.

Example 25: A non-transitory computer-readable medium storing code for wireless communication comprising a processor, memory in electronic communication with the processor, and instructions stored in the memory and executable by the processor to cause the apparatus to perform a method of any one of examples 1 through 12.

Example 26: An apparatus for wireless communication comprising at least one means for performing a method of any one of the examples 13 through 22.

Example 27: An apparatus for wireless communication comprising a processor and memory coupled to the processor, the processor and memory configured to cause the apparatus to perform a method of any one of examples 13 through 22.

Example 28: A non-transitory computer-readable medium storing code for wireless communication comprising a processor, memory in electronic communication with the processor, and instructions stored in the memory and executable by the processor to cause the apparatus to perform a method of any one of examples 13 through 22.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first cell, comprising:
   transmitting a control message to a user equipment (UE) indicating that the UE is to transmit sounding reference signals;
   transmitting, based at least in part on transmitting the control message, a measurement request to one or more second cells capable of transmitting a single frequency network transmission to the UE with the first cell, the measurement request indicating for the one or more second cells to perform measurements on the sounding reference signals;
   selecting a subset of the one or more second cells to include in a single frequency network cell group for the single frequency network transmission based at least in part on transmitting the measurement request; and
   transmitting the single frequency network transmission to the UE synchronously with the selected subset of the one or more second cells based at least in part on transmitting the measurement request.

2. The method of claim 1, further comprising:
   receiving, from a second cell of the one or more second cells, a measurement report indicating a result of the measurements performed by the second cell on the sounding reference signals.

3. The method of claim 2, further comprising:
   adding the second cell to the single frequency network cell group for the single frequency network transmission based at least in part on the measurement report;
   transmitting, to the second cell, a request for the second cell to transmit the single frequency network transmission to the UE with the first cell; and
   transmitting the single frequency network transmission to the UE with the second cell.

4. The method of claim 2, further comprising:
   excluding the second cell from the single frequency network cell group for the single frequency network transmission based at least in part on the measurement report.

5. The method of claim 1, further comprising:
   transmitting, to the one or more second cells, a request for the one or more second cells to transmit the single frequency network transmission to the UE with the first cell.

6. The method of claim 1, further comprising:
   transmitting, to the UE, an indication of one or more synchronization signal blocks to be transmitted by a second cell of the one or more second cells; and
   receiving, from the UE, a result of measurements performed by the UE on the one or more synchronization signal blocks transmitted by the second cell.

7. The method of claim 6, further comprising:
   adding the second cell to the single frequency network cell group for the single frequency network transmission based at least in part on the measurements performed by the UE on the one or more synchronization signal blocks transmitted by the second cell;

transmitting, to the second cell, a request for the second cell to transmit the single frequency network transmission to the UE with the first cell; and transmitting the single frequency network transmission to the UE with the second cell.

8. The method of claim 6, further comprising:

excluding the second cell from the single frequency network cell group for the single frequency network transmission based at least in part on the measurements performed by the UE on the one or more synchronization signal blocks transmitted by the second cell.

9. The method of claim 6, further comprising:

transmitting, in the measurement request to the second cell, an index of a synchronization signal block selected by the UE based at least in part on the measurements performed by the UE on the one or more synchronization signal blocks transmitted by the second cell.

10. The method of claim 1, further comprising:

transmitting, to the UE, downlink control information comprising a transmission configuration indicator (TCI) indicating a receive beam corresponding to a synchronization signal block of the first cell for the UE to use to receive the single frequency network transmission.

11. The method of claim 1, wherein the measurement request comprises a set of time-frequency resources used to transmit the sounding reference signals, a period of the sounding reference signals, a repetition number of the sounding reference signals, or a combination thereof.

12. A method for wireless communication at a second cell, comprising:

receiving, from a first cell capable of transmitting a single frequency network transmission to a user equipment (UE) with the second cell, a measurement request indicating that the second cell is to perform measurements on sounding reference signals received from the UE;

receiving the sounding reference signals from the UE based at least in part on the received measurement request;

performing the measurements on the sounding reference signals received from the UE; and transmitting the single frequency network transmission to the UE synchronously with the first cell based at least in part on the measurements.

13. The method of claim 12, further comprising:

transmitting, to the first cell, a measurement report indicating a result of the measurements performed by the second cell on the sounding reference signals.

14. The method of claim 13, further comprising:

receiving, from the first cell, a request for the second cell to transmit the single frequency network transmission to the UE with the first cell based at least in part on the measurement report; and transmitting the single frequency network transmission to the UE with the first cell based at least in part on receiving the request.

15. The method of claim 13, wherein performing the measurements on the sounding reference signals received from the UE comprises:

receiving the sounding reference signals on a first set of beams associated with a plurality of synchronization signal blocks; and performing the measurements on the sounding reference signals received on the first set of beams.

16. The method of claim 15, wherein the measurement report comprises an index of a synchronization signal block corresponding to a first beam selected from the first set of beams based at least in part on the measurements performed by the second cell on the sounding reference signals, an indication of a received power of the sounding reference signals on the first beam, or a combination thereof.

17. The method of claim 12, further comprising:

receiving, from the first cell, a request for the second cell to transmit the single frequency network transmission to the UE with the first cell; and transmitting the single frequency network transmission to the UE with the first cell based at least in part on the measurements performed by the second cell on the sounding reference signals.

18. The method of claim 17, wherein performing the measurements on the sounding reference signals received from the UE comprises:

receiving the sounding reference signals on a first set of beams, each beam of the first set of beams associated with a synchronization signal block; and performing the measurements on the sounding reference signals received on the first set of beams.

19. The method of claim 12, further comprising:

transmitting one or more synchronization signal blocks;

receiving, based at least in part on transmitting the one or more synchronization signal blocks, an index of a synchronization signal block of the one or more synchronization signal blocks in the measurement request, the synchronization signal block selected by the UE based at least in part on the measurements performed by the UE on the one or more synchronization signal blocks; and receiving, from the first cell, a request for the second cell to transmit the single frequency network transmission to the UE with the first cell based at least in part on receiving the index of the synchronization signal block.

20. The method of claim 19, further comprising:

receiving the sounding reference signals on a second set of beams, each beam of the second set of beams associated with a channel state information reference signal, and the second set of beams being associated with the synchronization signal block;

performing the measurements on the sounding reference signals received on the second set of beams;

selecting a beam of the second set of beams to use to transmit the single frequency network transmission to the UE with the first cell based at least in part on the measurements performed on the sounding reference signals received on each of the second set of beams; and transmitting the single frequency network transmission to the UE with the first cell on the selected beam.

21. The method of claim 12, wherein the measurement request comprises a set of time-frequency resources used to transmit the sounding reference signals, a period of the sounding reference signals, a repetition number of the sounding reference signals, or a combination thereof.

22. An apparatus for wireless communication at a first cell, comprising:

a processor, memory coupled with the processor; and instructions stored in the memory and executable by the processor to cause the apparatus to:

transmit a control message to a user equipment (UE) indicating that the UE is to transmit sounding reference signals;

transmit, based at least in part on transmitting the control message, a measurement request to one or more second cells capable of transmitting a single frequency network transmission to the UE with the first cell, the measurement request indicating for the one or more second cells to perform measurements on the sounding reference signals;

select a subset of the one or more second cells to include in a single frequency network cell group for the single frequency network transmission based at least in part on transmitting the measurement request; and transmit the single frequency network transmission to the UE synchronously with the selected subset of the one or more second cells based at least in part on transmitting the measurement request.

23. The apparatus of claim 22, wherein the instructions are further executable by the processor to cause the apparatus to:

receive, from a second cell of the one or more second cells, a measurement report indicating a result of the measurements performed by the second cell on the sounding reference signals.

24. The apparatus of claim 23, wherein the instructions are further executable by the processor to cause the apparatus to:

add the second cell to the single frequency network cell group for the single frequency network transmission based at least in part on the measurement report;

transmit, to the second cell, a request for the second cell to transmit the single frequency network transmission to the UE with the first cell; and transmit the single frequency network transmission to the UE with the second cell.

25. The apparatus of claim 23, wherein the instructions are further executable by the processor to cause the apparatus to:

exclude the second cell from the single frequency network cell group for the single frequency network transmission based at least in part on the measurement report.

26. An apparatus for wireless communication at a second cell, comprising:

a processor, memory coupled with the processor; and instructions stored in the memory and executable by the processor to cause the apparatus to:

receive, from a first cell capable of transmitting a single frequency network transmission to a user equipment (UE) with the second cell, a measurement request indicating that the second cell is to perform measurements on sounding reference signals received from the UE;

receive the sounding reference signals from the UE based at least in part on the received measurement request;

perform the measurements on the sounding reference signals received from the UE; and transmit the single frequency network transmission to the UE synchronously with the first cell based at least in part on the measurements.

27. The apparatus of claim 26, wherein the instructions are further executable by the processor to cause the apparatus to:

transmit, to the first cell, a measurement report indicating a result of the measurements performed by the second cell on the sounding reference signals.

28. The apparatus of claim 27, wherein the instructions are further executable by the processor to cause the apparatus to:

receive, from the first cell, a request for the second cell to transmit the single frequency network transmission to the UE with the first cell based at least in part on the measurement report; and transmit the single frequency network transmission to the UE with the first cell based at least in part on receiving the request.

29. The apparatus of claim 27, wherein the instructions to perform the measurements on the sounding reference signals received from the UE are executable by the processor to cause the apparatus to:

receive the sounding reference signals on a first set of beams associated with a plurality of synchronization signal blocks; and perform the measurements on the sounding reference signals received on the first set of beams.

* * * * *